United States Patent
Qin et al.

(10) Patent No.: US 11,513,565 B2
(45) Date of Patent: Nov. 29, 2022

(54) MULTIPURPOSE SPEAKER ENCLOSURE IN A DISPLAY ASSISTANT DEVICE

(71) Applicant: GOOGLE LLC, Mountain View, CA (US)

(72) Inventors: Xiaoping Qin, San Jose, CA (US); Christen Cameron Bilger, Sunnyvale, CA (US); Frederic Heckmann, Mountain View, CA (US); Frances Kwee, Redwood City, CA (US); Justin Leong, Milpitas, CA (US); James Castro, San Jose, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/651,545

(22) PCT Filed: Apr. 24, 2019

(86) PCT No.: PCT/US2019/028959
§ 371 (c)(1),
(2) Date: Mar. 27, 2020

(87) PCT Pub. No.: WO2020/076364
PCT Pub. Date: Apr. 16, 2020

(65) Prior Publication Data
US 2021/0011518 A1    Jan. 14, 2021

Related U.S. Application Data

(60) Provisional application No. 62/743,464, filed on Oct. 9, 2018, provisional application No. 62/742,892, filed on (Continued)

(30) Foreign Application Priority Data

Dec. 7, 2018    (WO) ............... PCT/US2018/064449
Dec. 7, 2018    (WO) ............... PCT/US2018/064452
(Continued)

(51) Int. Cl.
*G06F 1/16*    (2006.01)
*G06F 3/16*    (2006.01)
(Continued)

(52) U.S. Cl.
CPC ........ *G06F 1/166* (2013.01); *G02F 1/133308* (2013.01); *G02F 1/133753* (2013.01);
(Continued)

(58) Field of Classification Search
CPC ...... G06F 1/166; G06F 1/1626; G06F 1/1637; G06F 3/167; G06F 1/1683; G06F 1/1686;
(Continued)

(56) References Cited

U.S. PATENT DOCUMENTS 5,729,430 A * 3/1998 Johnson ............... F16M 13/025
                                                    312/208.3
5,822,443 A * 10/1998 Kim ......................... H04R 5/02
                                                    381/388
(Continued)

FOREIGN PATENT DOCUMENTS

CN    107454513    12/2017
EP    0303912    2/1989
(Continued)

OTHER PUBLICATIONS

Google LLC, International Search Report and Written Opinion, PCT/US2019/028959, dated Jul. 24, 2019, 15 pgs.
(Continued)

*Primary Examiner* — Oyesola C Ojo
(74) *Attorney, Agent, or Firm* — Byrne Poh LLP

(57) ABSTRACT

This application is directed to a speaker assembly in which a speaker is mounted in an enclosure structure. The enclosure structure exposes a speaker opening of the speaker and provides a sealed enclosure for a rear portion of the speaker, and further includes an electrically conductive portion. One or more electronic components are coupled to the electrically conductive portion of the enclosure structure (which is grounded in some implementations). The electrically conductive portion of the enclosure structure is configured to provide electromagnetic shielding for the electronic components and forms part of the sealed enclosure of the speaker. In some implementations, the electrically conductive portion of the enclosure structure is thermally coupled to the electronic components and acts as a heat sink that is configured to absorb heat generated by the electronic components and
(Continued)

dissipate the generated heat away from the electronic components.

19 Claims, 12 Drawing Sheets

Related U.S. Application Data on Oct. 8, 2018, provisional application No. 62/742,888, filed on Oct. 8, 2018.

(30) Foreign Application Priority Data

| Dec. 7, 2018 | (WO) | ................ | PCT/US2018/064536 |
| Apr. 23, 2019 | (WO) | ................ | PCT/US2019/028601 |

(51) Int. Cl.

| G10L 15/28 | (2013.01) |
| H04R 1/02 | (2006.01) |
| H04R 1/34 | (2006.01) |
| G02F 1/1333 | (2006.01) |
| G02F 1/1337 | (2006.01) |
| G06F 21/83 | (2013.01) |
| H04L 12/28 | (2006.01) |

(52) U.S. Cl.
CPC .......... *G06F 1/1605* (2013.01); *G06F 1/1626* (2013.01); *G06F 1/1637* (2013.01); *G06F 1/1658* (2013.01); *G06F 1/1683* (2013.01); *G06F 1/1686* (2013.01); *G06F 1/1688* (2013.01); *G06F 1/1698* (2013.01); *G06F 3/167* (2013.01); *G06F 21/83* (2013.01); *G10L 15/28* (2013.01); *H04R 1/023* (2013.01); *H04R 1/025* (2013.01); *H04R 1/028* (2013.01); *H04R 1/345* (2013.01); *G02F 1/133325* (2021.01); *G02F 1/133761* (2021.01); *H04L 12/282* (2013.01); *H04R 2499/15* (2013.01)

(58) Field of Classification Search
CPC ...... G06F 1/1688; G06F 1/1698; G06F 21/83; G06F 1/16; G06F 21/6245; G06F 1/1658; G06F 1/1671; G06F 1/203; G06F 2200/1631; G06F 1/1656; G06F 1/1605; H04R 1/023; H04R 1/028; H04R 1/345; H04R 1/025; H04R 2499/15; H04R 1/02; H04R 27/00; H04R 2227/003; H04R 2227/005; H04R 1/026; H04R 1/34; H04R 1/021; G02F 1/133308; G02F 1/133753; G02F 2001/133325; G02F 2001/133761; G02F 1/16; G02F 21/6245; G10L 15/28; H04L 12/282; H04N 7/14; H04N 21/4223; H04N 21/46315
See application file for complete search history.

(56) References Cited

U.S. PATENT DOCUMENTS

| 6,032,918 | A | * | 3/2000 | Cho | ................ | G06F 1/1605 |
| | | | | | | 248/688 |
| 6,411,271 | B1 | | 6/2002 | Bangil-Soon | | |
| 6,437,238 | B1 | | 8/2002 | Annerino et al. | | |
| 7,388,744 | B2 | | 2/2008 | Chu | | |
| D563,405 | S | | 3/2008 | Taniho et al. | | |
| 7,576,983 | B2 | | 8/2009 | Yamaguchi et al. | | |
| 7,953,242 | B2 | | 5/2011 | Soga | | |
| 8,528,690 | B1 | | 9/2013 | Wu | | |
| 9,064,386 | B2 | | 6/2015 | Won et al. | | |
| 9,641,920 | B1 | | 5/2017 | Jones | | |
| D789,362 | S | | 6/2017 | Elijas | | |
| D811,383 | S | | 2/2018 | Diasabeygunawardena et al. | | |
| 10,306,356 | B2 | * | 5/2019 | Katz | ................ | H04R 1/323 |
| 10,484,770 | B1 | | 11/2019 | Rao et al. | | |
| D873,815 | S | | 1/2020 | McWilliam et al. | | |
| 10,996,717 | B2 | | 5/2021 | Castro et al. | | |
| 11,310,577 | B2 | * | 4/2022 | Je | ................ | H04R 1/025 |
| 2005/0129263 | A1 | | 6/2005 | Tamura et al. | | |
| 2005/0233781 | A1 | | 10/2005 | Erixon et al. | | |
| 2006/0008103 | A1 | * | 1/2006 | Takahashi | ................ | H04R 5/02 |
| | | | | | | 381/388 |
| 2006/0039571 | A1 | * | 2/2006 | Harris | ................ | H04R 9/022 |
| | | | | | | 381/189 |
| 2006/0070280 | A1 | | 4/2006 | Yamamura et al. | | |
| 2007/0097608 | A1 | * | 5/2007 | Matsutani | ................ | F16M 11/10 |
| | | | | | | 248/917 |
| 2007/0206123 | A1 | * | 9/2007 | Hsieh | ................ | H04N 5/64 |
| | | | | | | 348/794 |
| 2008/0165485 | A1 | | 7/2008 | Zadesky et al. | | |
| 2010/0146766 | A1 | | 6/2010 | Dabov et al. | | |
| 2010/0205667 | A1 | | 8/2010 | Anderson et al. | | |
| 2010/0212996 | A1 | | 8/2010 | Takashima | | |
| 2010/0272307 | A1 | * | 10/2010 | Okumura | ................ | H04N 5/642 |
| | | | | | | 381/388 |
| 2013/0058023 | A1 | | 3/2013 | Supran et al. | | |
| 2013/0070172 | A1 | * | 3/2013 | Ooe | ................ | H05K 7/20972 |
| | | | | | | 361/695 |
| 2013/0077812 | A1 | | 3/2013 | Kishinami et al. | | |
| 2013/0082984 | A1 | | 4/2013 | Drzaic et al. | | |
| 2013/0098854 | A1 | | 4/2013 | Lee et al. | | |
| 2013/0235420 | A1 | | 9/2013 | Nihashi et al. | | |
| 2013/0279730 | A1 | | 10/2013 | Tanaka | | |
| 2013/0282499 | A1 | | 10/2013 | Kato | | |
| 2014/0112512 | A1 | | 4/2014 | Su et al. | | |
| 2014/0247959 | A1 | * | 9/2014 | Yamanaka | ................ | H04R 1/345 |
| | | | | | | 381/388 |
| 2014/0268578 | A1 | * | 9/2014 | Dolci | ................ | H05K 9/0049 |
| | | | | | | 361/721 |
| 2014/0376758 | A1 | | 12/2014 | Barcel et al. | | |
| 2015/0049894 | A1 | | 2/2015 | Ditullo et al. | | |
| 2015/0053497 | A1 | * | 2/2015 | Horiuchi | ................ | H04R 1/345 |
| | | | | | | 181/199 |
| 2015/0185768 | A1 | | 7/2015 | Voege et al. | | |
| 2015/0195635 | A1 | | 7/2015 | Garfio et al. | | |
| 2015/0278499 | A1 | | 10/2015 | Levitov | | |
| 2015/0326816 | A1 | * | 11/2015 | Hamadate | ................ | H04R 5/02 |
| | | | | | | 348/843 |
| 2015/0373440 | A1 | | 12/2015 | Fontana | | |
| 2016/0037665 | A1 | | 2/2016 | Zhang et al. | | |
| 2016/0139702 | A1 | | 5/2016 | Franklin et al. | | |
| 2017/0006715 | A1 | | 1/2017 | Choi et al. | | |
| 2017/0208364 | A1 | | 7/2017 | Glazier et al. | | |
| 2017/0258191 | A1 | | 9/2017 | Poon et al. | | |
| 2017/0278361 | A1 | | 9/2017 | Fujimoto | | |
| 2017/0300893 | A1 | | 10/2017 | Sasaki et al. | | |
| 2018/0174584 | A1 | | 6/2018 | Chih et al. | | |
| 2018/0190285 | A1 | | 7/2018 | Heckman et al. | | |
| 2018/0199123 | A1 | | 7/2018 | Rao et al. | | |
| 2019/0029103 | A1 | * | 1/2019 | MacDonald | ......... | H05K 1/0203 |
| 2019/0114880 | A1 | | 4/2019 | Hanes | | |
| 2019/0181533 | A1 | | 6/2019 | Gummalla et al. | | |
| 2019/0212274 | A1 | | 7/2019 | Zerrad et al. | | |
| 2019/0212774 | A1 | | 7/2019 | Patterson et al. | | |
| 2020/0090662 | A1 | | 3/2020 | Castro et al. | | |
| 2020/0110441 | A1 | | 4/2020 | Castro et al. | | |
| 2020/0112786 | A1 | | 4/2020 | Castro et al. | | |
| 2021/0011518 | A1 | | 1/2021 | Zin et al. | | |
| 2021/0191456 | A1 | | 6/2021 | Castro et al. | | |

FOREIGN PATENT DOCUMENTS

| EP | 3122022 | 1/2017 |
| JP | 2001169378 | 6/2001 |
| JP | 2007259262 A | 4/2007 |
| JP | 2008211381 | 9/2008 |
| JP | 2009038446 | 2/2009 |
| JP | 2009267577 | 11/2009 |

(56) References Cited

FOREIGN PATENT DOCUMENTS

| | | | |
|---|---|---|---|
| JP | 1808168 | 11/2011 | |
| JP | 2014131243 | 7/2014 | |
| JP | 2018121168 | 8/2018 | |
| TW | 201131335 | 9/2011 | |
| WO | WO 2006104101 | 10/2006 | |
| WO | WO-2006104101 A1 * | 10/2006 | ........... H04R 1/2819 |
| WO | WO 2016198559 A1 | 12/2016 | |
| WO | 2018139462 | 8/2018 | |

OTHER PUBLICATIONS

"ARCHOS Hello Activates AI, Displays and Manages Anything, Anywhere at home, just by Asking", http://www.archos.com/corporate/press/press_releases/EN_201 80828_ARCHOS_IFA_Next_2018_ARCHOS_Hello.pdf, Aug. 28, 2018, 6 pages.

"International Search Report and Written Opinion", Application No. PCT/US2018/064452, dated Jun. 24, 2019, 12 pages.

"International Search Report and Written Opinion", Application No. PCT/US2018/064536, dated Jun. 28, 2019, 10 pages.

"International Search Report and Written Opinion", Application No. PCT/US2018/064449, dated Aug. 28, 2019, 21 pages.

"International Search Report and Written Opinion", Application No. PCT/US2019/028601, dated Dec. 20, 2019, 18 pages.

"Lynky: Touchscreen Smart hub with Google Assistant", Feb. 24, 2018, 2 pages.

"Non-Final Office Action", U.S. Appl. No. 16/596,711, filed Oct. 14, 2020, 17 pages.

"Non-Final Office Action", U.S. Appl. No. 16/597,745, filed Nov. 25, 2020, 9 pages.

"Notice of Allowance", U.S. Appl. No. 16/597,745, filed Jan. 25, 2021, 8 pages.

"Pre-Interview First Office Action", U.S. Appl. No. 16/525,360, filed Jul. 2, 2020, 3 pages.

"We took apart the Google Home Hub and the Amazon Echo Show 2 | Cracking Open", https://www.youtube.com/watch?v=9vo7PtXlzCk, Jan. 27, 2019, 1 page.

AWAD, "Exclusive Google Home Hub to be Launched on October 9", Retrieved at: https://web.archive.org/web/20181009015232/https://www.mysmartprice.com/gear/google-home-hub/, Sep. 18, 2018, 6 pages.

Burns, "Google Home Hub leaked: The new do-all screen", Sep. 18, 2018, 7 pages.

"Non-Final Office Action", U.S. Appl. No. 16/596,711, filed Jun. 28, 2021, 14 pages.

"Non-Final Office Action", U.S. Appl. No. 16/525,360, filed Aug. 6, 2021, 18 pages.

"Final Office Action", U.S. Appl. No. 16/596,711, filed Feb. 25, 2021, 19 pages.

"Final Office Action", U.S. Appl. No. 16/525,360, filed Apr. 30, 2021, 16 pages.

"International Preliminary Report on Patentability", Application No. PCT/US2018/064449, dated Mar. 23, 2021, 16 pages.

"International Preliminary Report on Patentability", Application No. PCT/US2019/028959, dated Apr. 8, 2021, 10 pages.

"International Preliminary Report on Patentability", Application No. PCT/US2019/028601, dated Apr. 8, 2021, 14 pages.

"International Preliminary Report on Patentability", Application No. PCT/US2018/064536, dated Apr. 8, 2021, 9 pages.

"International Preliminary Report on Patentability", Application No. PCT/US2018/064452, dated Apr. 8, 2021, 10 pages.

"Notice of Allowance", U.S. Appl. No. 16/597,745, filed Mar. 31, 2021, 8 pages.

Examination Report dated Oct. 14, 2021 in EP Patent Application No. 19728777.4.

Examination Report dated Nov. 17, 2021 in EP Patent Application No. 18830344.0.

Notice of Allowance dated Jan. 25, 2021 in U.S. Appl. No. 16/597,745.

Notice of Allowance dated Oct. 20, 2021 in U.S. Appl. No. 16/596,711.

Notice of Allowance dated Nov. 24, 2021 in U.S. Appl. No. 16/596,711.

Office Action dated Jan. 31, 2022 in U.S. Appl. No. 17/196,060.

Office Action dated Mar. 7, 2022 in U.S. Appl. No. 16/596,709.

Office Action dated Dec. 29, 2021 in U.S. Appl. No. 16/525,360.

Office Action dated Apr. 29, 2022 in U.S. Appl. No. 16/525,360.

Examination Report dated Apr. 21, 2022 in EP Patent Application No. 19728765.9.

Examination Report dated Jun. 23, 2022 in EP Patent Application No. 18830096.6.

Notice of Allowance dated Jun. 16, 2022 in U.S. Appl. No. 17/196,060.

Office Action dated Jun. 16, 2022 in U.S. Appl. No. 16/596,709.

* cited by examiner

MULTIPURPOSE SPEAKER ENCLOSURE IN A DISPLAY ASSISTANT DEVICE

CROSS REFERENCE TO RELATED APPLICATIONS

This Application is a United States National Stage Application filed under 35 U.S.C. § 371 of International Application No. PCT/US2019/028959, filed on Apr. 24, 2019, which claims priority to the following patent applications:
- U.S. Provisional Patent Application No. 62/742,892, filed Oct. 8, 2018, titled "Display Assistant Device";
- U.S. Provisional Patent Application No. 62/742,888, filed Oct. 8, 2018, titled "Drop Protection for Display Assistant Device";
- U.S. Provisional Patent Application No. 62/743, 464, filed Oct. 9, 2018, titled "Speaker Assembly in a Display Assistant Device";
- International Application No. PCT/US2018/064449, filed Dec. 7, 2018, titled "Display Assistant Device";
- International Application No. PCT/US2018/064452, filed Dec. 7, 2018, titled "Drop Protection for Display Assistant Device";
- International Application No. PCT/US2018/064536, filed Dec. 7, 2018, titled "Speaker Assembly in a Display Assistant Device"; and
- International Application No. PCT/US2019/028601, filed Apr. 23, 2019, titled "Display Assistant Device."

Each of the above-referenced applications is herein incorporated by reference in its entirety.

TECHNICAL FIELD

This application relates generally to electronic devices, including but not limited to for guiding sound from a speaker facing towards a rear view of a display assistant device.

BACKGROUND

Electronic devices integrated with microphones have been widely used to collect voice inputs from users and implement different voice-activated functions according to the voice inputs. These electronic devices, when made at a low cost and with relatively simple structures, are disposed at different locations in a smart home environment, so that they can be used as user interface devices to listen to the ambient environment and follow a user constantly without disturbing regular activities of the user. The electronic devices disposed at different locations in a smart home environment could be subject to restricted footprints, especially in areas such as a cluttered kitchen countertop or bedroom nightstand. As such, it would be beneficial to pack a number of mechanical and electronic parts into a small package in order to accommodate a smaller footprint. This, however, can potentially cause unintended consequences such as muffled sound due to the speaker being obscured underneath other components, such as a display screen. Further, it would be beneficial in designing a smaller footprint for the overall design to be substantially vertical. However, the more vertical the design, the greater the potential for falling over during physical user interactions due to a higher center of mass. It would be beneficial to incorporate one or more space saving designs that do not negatively affect sound quality, and further allow for a vertically oriented device to maintain a lower center of mass.

SUMMARY

An electronic device is applied in a smart home environment to provide an eyes-free and hands-free voice interface that can activate voice-activated functions to control media devices or smart home devices in the smart home environment. The electronic device is configured to sit at a fixed location in the smart home environment, and at least includes a display screen in addition to a microphone and a speaker. The electronic device does not include a complicated operating system, but provides a low cost user interface solution dedicated to constantly listening to its surroundings, collecting audio inputs, and presenting both audio and video information in response to the audio inputs. Further, in some implementations, the audio inputs are collected from the surroundings to initiate voice-activated functions on other media play devices or smart home devices coupled within the smart home environment. Examples of these voice-activated functions include, but are not limited to, initiating play of media content, transferring media content among different media devices, reviewing smart device readings and statuses, powering on or off a smart device, and controlling smart device settings. That said, the display assistant device can also deliver a home monitoring service in addition to its core consumption uses for entertainment, family connection, and productivity. The display assistant device includes a built-in camera that is configured to allow users to keep track of what is happening at home, thus providing users with peace of mind. The display assistant device further includes affordances that identify its operation mode to users (e.g., account owners, family members, and visitors) as they interact with the device.

In accordance with one aspect of this application, a speaker assembly includes a speaker, an enclosure structure and one or more electronic components. The speaker is mounted in the enclosure structure, and the enclosure structure exposes a speaker opening of the speaker and provides a sealed enclosure for a rear portion of the speaker. The enclosure structure further includes an electrically conductive portion. The one or more electronic components are coupled to the electrically conductive portion of the enclosure structure (which is grounded in some implementations). The electrically conductive portion of the enclosure structure is configured to provide electromagnetic shielding for the one or more electronic components and forms part of the sealed enclosure of the speaker. In some implementations, the electrically conductive portion of the enclosure structure is thermally coupled to the one or more electronic components and acts as a heat sink that is configured to absorb heat generated by the one or more electronic components and dissipate the generated heat away from the one or more electronic components. Optionally, the electrically conductive portion of the enclosure structure and the one or more electronic components are thermally coupled to each other via a thermal spreader. In some situations, the electrically conductive portion provides an entire top surface of the enclosure structure.

In some implementations, the one or more electronic components are mounted on a logic board, and the logic board is mounted on the electrically conductive portion of the enclosure structure, thereby allowing the one or more electronic components to be mechanically coupled to the electrically conductive portion of the enclosure structure via the logic board. Further, in some implementations, the electrically conductive portion of the enclosure structure includes a recess configured to receive the one or more electronic components when the logic board is mounted on the electrically conductive portion of the enclosure structure. In some embodiments, a thermal spreader is disposed in the recess and thermally coupled between the one or more electronic components and the electrically conductive portion of the enclosure structure. The thermal spreader is configured to transfer heat generated by the one or more electronic components to the electrically conductive portion. In some implementations, the logic board further includes a grounded plane that is electrically coupled to the electrically conductive portion to provide the electromagnetic shielding that encloses the one or more electronic components.

In an example, the one or more electronic components are surrounded by an electromagnetic shielding fence fixed on the logic board. A flexible electrically conductive foam is disposed on top of the electromagnetic shielding fence. When the logic board is mounted on the electrically conductive portion of the enclosure structure, the electrically conductive portion of the enclosure structure is pressed onto the flexible electrically conductive foam and electrically coupled to the electrically conductive shielding fence via the flexible electrically conductive foam, thereby forming the electrical fielding that closely encloses the one or more electronic components.

In some implementations, the speaker includes a rear speaker, and the enclosure structure includes a base portion distinct from the electrically conductive portion. The speaker assembly further includes one or more front speakers each of which is individually packaged and integrated into the base portion of the enclosure structure, the one or more front speakers facing a front view that is opposition to a rear view which the rear speaker faces. Further, in some implementations, the enclosure structure includes a plurality of separated sealed spaces each of which provides a respective sealed enclosure for one of the front and rear speakers.

In accordance with various embodiments of this application, the display assistant device has a substantially small footprint that allows the display assistant device to be conveniently disposed at many different locations (e.g., a kitchen, living room and bedroom) in the smart home environment. Despite the substantially small footprint, the speaker has a relatively heavy weight and is configured to pull a center of mass of the display assistant device close to the surface on which the display assistant device sits. A low center of mass allows the display assistant device to maintain stability at them time of being touched or hit. The display assistant device further includes many mechanical features configured to protect the screen of the display assistant from falling apart from the base and being damaged when the display assistant device hits a floor. By these means, this application provides a low-cost, mechanically robust, and voice-activated user interface solution that has visual display capabilities and supports various voice-activated functions.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
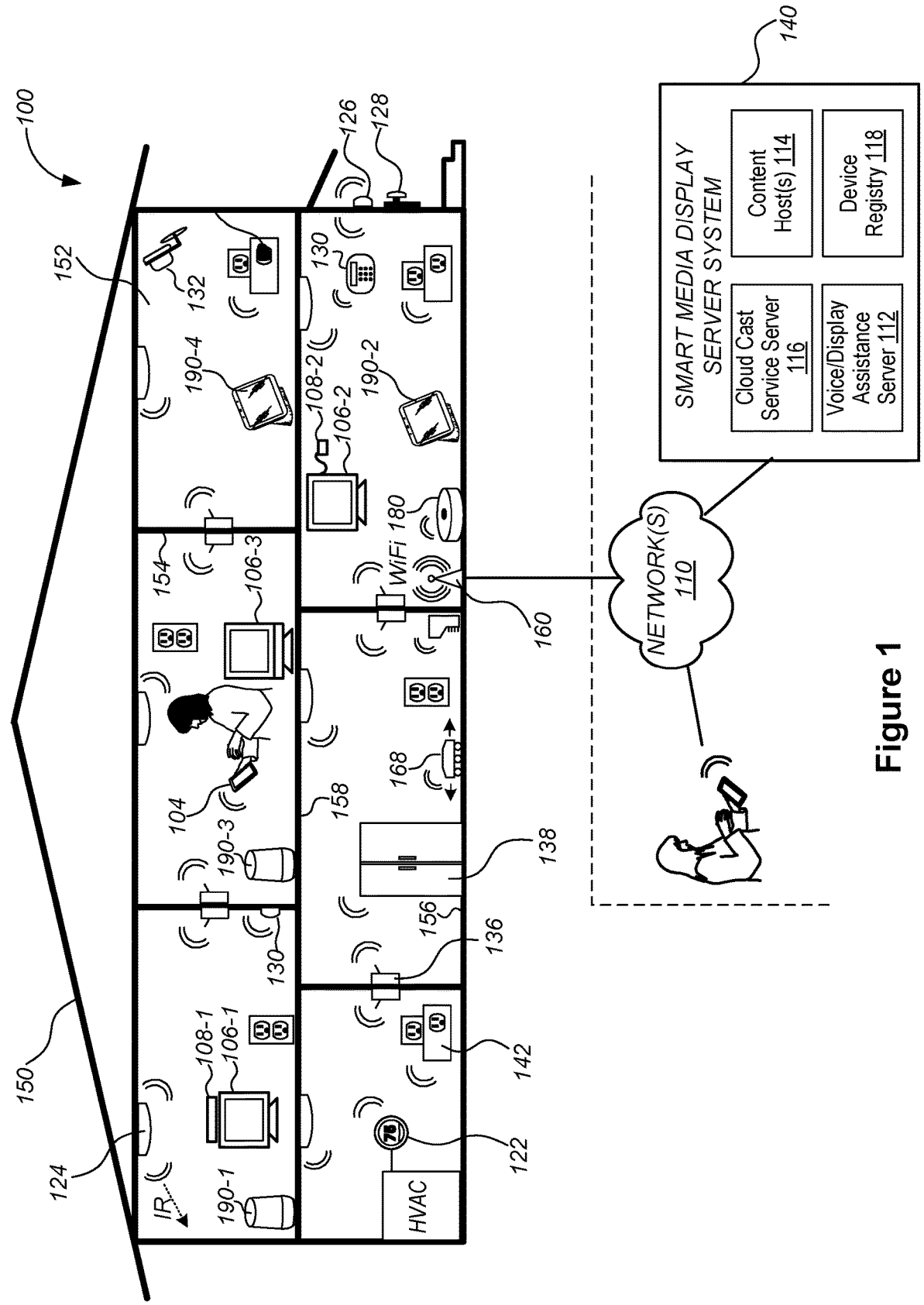
FIG. 1 is an example smart home environment in accordance with some implementations.

While digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes a screen configured to provide additional visual information in addition to audio information that can be broadcast via a speaker of the voice-activated electronic device. For example, the electronic device displays caller information (e.g., a caller's name and number) on the screen in response to receiving a voice command to initiate a phone call. The electronic device may play a YouTube video clip on the screen in response to receiving a voice command including identification information of the video clip. The electronic device may display a list of restaurants and their contact information in response to receiving a voice command for conducting a restaurant search. The electronic device may display a map and a suggested route in response to receiving a voice command to identify a route to a destination on a map. The electronic device may display event information of an upcoming event in response to receiving a voice command to review calendar events. The electronic device may display a post that is transcribed from a voice message in response to receiving a voice command to add a post to a social network. The electronic device may display information of a song that is currently being played (e.g., a title, composer and singer of the song, a YouTube link) in response to receiving a voice command to recognize the song.

Specifically, the voice-activated electronic device, when integrated with its own display screen, constitutes a display assistant device. The display assistant device thereby includes a base, a screen and a speaker. The base is configured for sitting on a surface, and has a front side and rear side that is taller than the front side. The screen has a rear surface and is supported by the front and rear sides of the base at its rear surface. The speaker is concealed inside the base and configured to project sound substantially towards the rear side of the base. A bottom edge of the screen is configured to be held above the surface by a predefined height, and the base is substantially hidden behind the screen from a front view of the display assistant device (i.e., the base appears to float in air from the front view). The display assistant device has a substantially small footprint, and however, a center of mass of the display assistant device is configured to be close to the surface on which the display assistant device sits, thereby allowing the display assistant device to maintain stability at a time of being touched or hit. That said, the display assistant device provides a low-cost, mechanically robust, and voice-activated user interface solution that has visual display capabilities and supports various voice-activated functions.

In various implementations of this application, display assistant devices integrated with microphones and cameras can be used to collect audio and visual inputs from users and implement voice-activated functions according to voice inputs. Some electronic devices include a voice assistant feature that is configured to use audio inputs to perform many tasks. The functionality of these display assistant devices can be further expanded to home security and remote monitoring, to provide peace of mind to users.

For example, consider a use case in which a first user purchases a voice-activated display assistant device with video monitoring capabilities. While commissioning (e.g., provisioning) the display assistant device for use in her smart home environment (e.g., using a smart home application installed on her mobile device), the first user receives a welcome message on the smart home application asking if she would like to configure the display assistant device for smart home monitoring. The first user accepts the offer and completes the provisioning process, during which the display assistant device is configured to perform video and audio monitoring functions in addition to a range of voice and display assistant functions. Thereafter, the first user is able to move about the room where the display assistant device is located while issuing multiple verbal requests to the display assistant device. The assistant device receives the verbal requests and presents responses, which include visual and/or audio information for the first user to view and/or listen to. Later, when the first user is at work, having configured the display assistant device for smart home monitoring, she is able to see a live video steam of the room, captured using the camera of the display assistant device, using her smart home application. The first user is also able to receive notifications alerting her to unusual activity or unfamiliar faces in the room captured by the camera and/or microphones of the display assistant device. In response to the notifications, the first user is able to check out a live view of the room and respond accordingly via her smart home application.

The use case described above mentions particular modalities through which the first user interacts with the display assistant device (e.g., voice inputs, or inputs received from a smart home application) and receives information from the display assistant device (e.g., information presented via the smart home application or via audio or video playback from the display assistant device). However, in some implementations the display assistant device is responsive to a wider range of inputs, including one or more of: voice inputs, inputs received from a smart home application, touch inputs entered on a touch sensitive display of the display assistant device, and/or air gestures performed in proximity to the display assistant device that are captured by its camera or a sensor included in the display assistant device, such as a radar transceiver or PIR detector.

In some implementations, a user is provided with various subscription options when provisioning the display assistant device. The subscription options include a first option (e.g., a free tier or a lower cost tier) that provides one or more of: a "Live View" capability (e.g., the ability to review via a smart home app or browser, in at least near real time, video from the camera); a "Talk & Listen" capability (e.g., the ability to speak and listen via a smart home app or browser, in real time, to an individual in proximity to the display assistant device); basic event notifications (e.g., notifications for motion events and/or sound events and/or person events captured by the camera and/or microphone of the display assistant device); a display assistant device camera history (e.g., a one-hour, three-hour, or five-hour history of camera recordings); and monitoring settings including a Home/Away Assist setting (e.g., a setting in which the display assistant device is configured to turn on its camera and enter monitoring mode when the user is "away" and to turn off its camera and exit monitoring mode when the user is "home") and Camera Scheduling (a setting in which the user is able to define a schedule for turning the camera and monitoring mode on and off). Further details regarding Live View and Talk & Listen operations are described below in the section entitled "Device Operation Modes." In some implementations, the subscription options include a second option (e.g., a paid tier or a higher cost tier) that includes all the features of the first option and additional features. In some implementations, the additional features included in second option include intelligent event notifications, such as Familiar Face, Activity Zone, Dog Barking, Person Talking, Broken Glass and Baby Crying alerts; Continuous Video History; Time Lapse Video Summaries; and/or Close-Up Tracking Views of events of interest. Details of intelligent event notifications are described in U.S. patent application Ser. No. 15/207,458, filed Jul. 11, 2016, titled "Methods and Systems for Providing Event Alerts," which is incorporated by reference herein in its entirety.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices (also referred to herein as "connected" or "smart" devices). It will be appreciated that smart devices may also be integrated into a smart home environment 100 that does not include an entire structure 150, such as an apartment, condominium, or office space. In some implementations, the smart devices include one or more of: personal client devices 104 (e.g., tablets, laptops or mobile phones), display devices 106, media casting or streaming devices 108, thermostats 122, home protection devices 124 (e.g., smoke, fire and carbon dioxide detector), home security devices (e.g., motion detectors, window and door sensors and alarms), including connected doorbell/cameras 126, connected locksets 128, alarm systems 130 and cameras 132, connected wall switches transponders 136, connected appliances 138, WiFi communication devices 160 (e.g., hubs, routers, extenders), connected home cleaning devices 168 (e.g., vacuum or floor cleaner), smart home communication and control hubs 180, voice assistant devices 192, and display assistant devices 190.

It is to be appreciated that the term "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, yards, parks, and more generally any living space or work space.

It is also to be appreciated that while the terms user, customer, installer, homeowner, occupant, guest, tenant, landlord, repair person, and the like may be used to refer to a person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide users with access to media content that is stored locally or streamed from a remote content source (e.g., content host(s) 114). In some implementations, the media devices include media output devices 106, which directly output/display/play media content to an audience, and cast devices 108, which stream media content received over one or more networks to the media output devices 106. Examples of the media output devices 106 include, but are not limited to, television (TV) display devices, music players and computer monitors. Examples of the cast devices 108 include, but are not limited to, medial streaming boxes, casting devices (e.g., GOOGLE CHROMECAST devices), set-top boxes (STBs), DVD players and TV boxes.

In the example smart home environment 100, media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-3 includes a smart TV device that integrates an embedded casting unit to stream media content for display to its audience. The media output device 106-2 includes a regular TV display that is coupled to a TV box 108-1 (e.g., Google TV or Apple TV products), and such a TV box 108-2 streams media content received from a media content host server 114 and provides an access to the Internet for displaying Internet-based content on the media output device 106-2.

In addition to the media devices 106 and 108, one or more electronic devices 190 and 192 are disposed in the smart home environment 100. Electronic devices 190 are display assistant devices and electronic devices 192 are voice assistant devices. In some implementations, the display assistant device 190 is also a voice assistant device. The electronic devices 190 and 192 collect audio inputs for initiating various media play functions of the devices 190 and 192 and/or media devices 106 and 108. In some implementations, the devices 190 and 192 are configured to provide media content that is stored locally or streamed from a remote content source. In some implementations, the electronic devices 190 and 192 are voice-activated and are disposed in proximity to a media device, for example, in the same room with the cast devices 108 and the media output devices 106. Alternatively, in some implementations, a voice-activated display assistant device 190-1 is disposed in a room having one or more smart home devices but not any media device. Alternatively, in some implementations, a voice-activated electronic device 190 is disposed in a location having no networked electronic device. This allows for the devices 190 and 192 to communicate with the media devices and share content that is being displayed on one device to another device (e.g., from device 190-1 to device 190-2 and/or media devices 108).

The voice-activated electronic device 190 includes at least one microphone, a speaker, a processor and memory storing at least one program for execution by the processor. The speaker is configured to allow the electronic device 190 to deliver voice messages to a location where the electronic device 190 is located in the smart home environment 100, thereby broadcasting information related to a current media content being displayed, reporting a state of audio input processing, having a conversation with or giving instructions to a user of the electronic device 190. For instance, in some embodiments, in response to a user query the device provides audible information to the user through the speaker. As an alternative to the voice messages, visual signals could also be used to provide feedback to the user of the electronic device 190 concerning the state of audio input processing, such as a notification displayed on the device.

In accordance with some implementations, an electronic device 190 is a voice interface device that is network-connected to provide voice recognition functions with the aid of a server system 140. In some implementations, the server system 140 includes a cloud cast service server 116 and/or a voice/display assistance server 112. For example, in some implementations an electronic device 190 includes a smart speaker that provides music (e.g., audio for video content being displayed on the device 190 or on a display device 106) to a user and allows eyes-free and hands-free access to a voice assistant service (e.g., Google Assistant).

Optionally, the electronic device 190 is a simple and low cost voice interface device, e.g., a speaker device and a display assistant device (including a display screen having no touch detection capability).

In some implementations, the voice-activated electronic devices 190 integrates a display screen in addition to the microphones, speaker, processor and memory (e.g., 190-2 and 190-4), and are referred to as "display assistant devices." The display screen is configured to provide additional visual information (e.g., media content, information pertaining to media content, etc.) in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs (e.g., user queries), and may be related to the audio information broadcast by the speaker. In some implementations, the display screen of the voice-activated electronic devices 190 includes a touch display screen configured to detect touch inputs on its surface (e.g., instructions provided through the touch display screen). Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the electronic device 190 and/or media output devices 106 via the cast devices 108, the electronic device 190 effectively enables a new level of control of cast-enabled media devices independently of whether the electronic device 190 has its own display. In an example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms. For instant, a first electronic device 190 may receive a user instruction that is directed towards a second electronic device 190-2 (e.g., a user instruction of "OK Google, show this photo album on the Kitchen device.").

Specifically, in some implementations, an electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself and/or on another connected media output device 106. For example, the user could issue a media play request by saying to the Wi-Fi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played and/or is being played on a display device. For instance, a user may instruct the device to provide information related to a current media content being displayed, such as ownership information or subject matter of the media content. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user wants to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a photo album or a video clip where play of the media content was forgone on the first output device 106.

In some implementations, the display assistant device includes a display screen and one-or more built in cameras (e.g., 190-4). The cameras are configured to capture images and/or videos, which are then transmitted (e.g., streamed) to a server system 140 for display on client devices(s) (e.g., authorized client devices 104 and 220, FIG. 2C).

In some implementations, the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network (e.g., 102 FIG. 1B) and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

In some implementations, the smart home devices in the smart home environment 100 includes, but is not limited to, one or more intelligent, multi-sensing, network-connected camera systems 132. In some embodiments, content that is captured by the camera systems 132 is displayed on the electronic devices 190 at a request of a user (e.g., a user instruction of "OK Google, Show the baby room monitor.") and/or according to settings of the home environment 100 (e.g., a setting to display content captured by the camera systems during the evening or in response to detecting an intruder).

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 104.

In some implementations, in addition to containing sensing capabilities, devices 122, 124, 126, 128, 130, 132, 136, 138, and 190 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a server system 140 (also called a central server system and/or a cloud-computing system herein). Optionally, the server system 140 may be associated with a manufacturer, support entity, or service provider associated with the cast devices 108 and the media content displayed to the user.

In general, any of the connected electronic devices described herein can be configured with a range of capabilities for interacting with users in the environment. For example, an electronic device can be configured with one or more microphones, one or more speakers and voice-interaction capabilities in which a user interacts with the device display assistant device via voice inputs received by the microphone and audible outputs played back by the speakers to present information to users. Similarly, an electronic device can be configured with buttons, switches and/or other touch-responsive sensors (such as a touch screen, touch panel, or capacitive or resistive touch sensors) to receive user inputs, and with haptic or other tactile feedback capabilities to provide tactile outputs to users. An electronic device can also be configured with visual output capabilities, such as a display panel and/or one or more indicator lights to output information to users visually, as described in U.S. patent application Ser. No. 15/592,120, titled "LED Design Language for Visual Affordance of Voice User Interfaces," which is incorporated herein by reference. In addition, an electronic device can be configured with movement sensors that can detect movement of objects and people in proximity to the electronic device, such as a radar transceiver(s) or PIR detector(s), as described in U.S. patent application Ser. No. 15/481,289, titled "Systems, Methods, and Devices for Utilizing Radar-Based Touch Interfaces," which is incorporated herein by reference.

Inputs received by any of these sensors can be processed by the electronic device and/or by a server communicatively coupled with the electronic device (e.g., the server system 140 of FIG. 1A). In some implementations, the electronic device and/or the server processes and/or prepares a response to the user's input(s), which response is output by the electronic device via one or more of the electronic device's output capabilities. In some implementations, the electronic device outputs via one or more of the electronic device's output capabilities information that is not directly responsive to a user input, but which is transmitted to the electronic device by a second electronic device in the environment, or by a server communicatively coupled with the electronic device. This transmitted information can be of virtually any type that is displayable/playable by the output capabilities of the electronic device.

The server system 140 provides data processing for monitoring and facilitating review of events (e.g., motion, audio, security, etc.) from data captured by the smart devices 120, such as video cameras 132, smart doorbells 106, and display assistant device 190-4. In some implementations, the server system 140 may include a voice/display assistance server 112 that processes audio inputs collected by voice-activated electronic devices 190, one or more content hosts 104 that provide the displayed media content, and a cloud cast service server 116 creating a virtual user domain based on distributed device terminals. The server system 140 also includes a device registry for keeping a record of the distributed device terminals in the virtual user environment. Examples of the distributed device terminals include, but are not limited to the voice-activated electronic devices 190, cast devices 108, media output devices 106 and smart home devices 122-138. In some implementations, these distributed device terminals are linked to a user account (e.g., a Google user account) in the virtual user domain. In some implementations, each of these functionalities and content hosts is a distinct server within the server system 140. In some implementations, a subset of these functionalities is integrated within the server system 140.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2A:
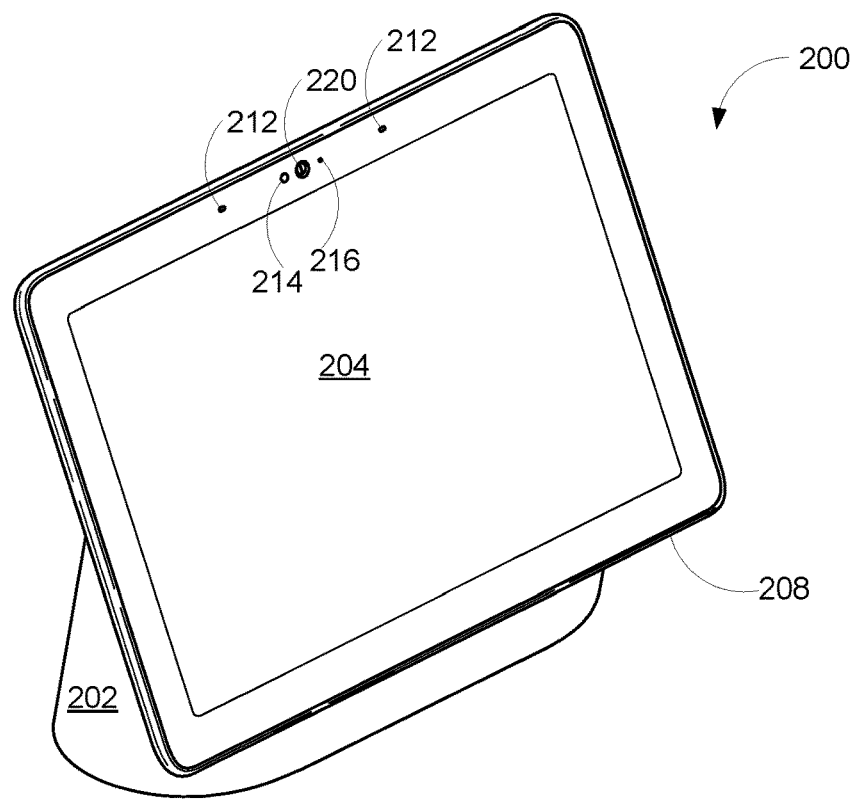
FIGS. 2A-2D are a perspective view, a front view, a side view and a rear view of a display assistant device in accordance with some implementations, respectively.
Figure 2B:
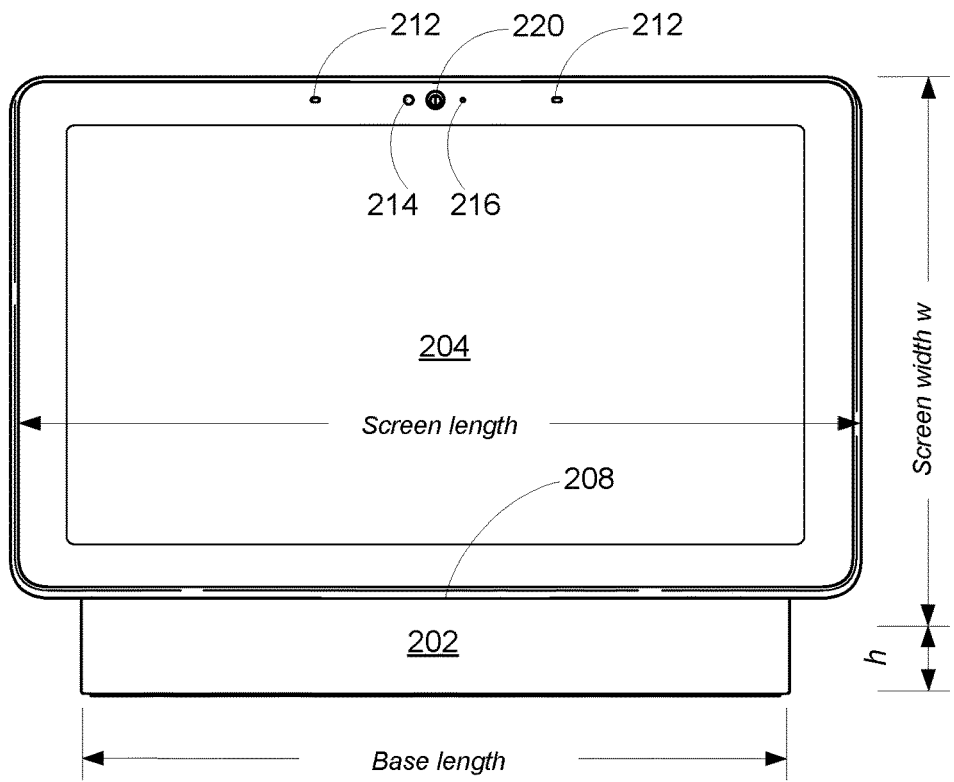

FIGS. 2A-2D are a perspective view, a front view, a side view and a rear view of a display assistant device 200 in accordance with some implementations, respectively. The display assistant device 200 includes a base 202 and a screen 204. The base 202 is configured for sitting on a surface (e.g., which is substantially flat in some situations). The screen 204 has a rear surface 206 at which the screen 204 is supported by the base. In some implementations, the base and the screen are coupled to each other via a plurality of fasteners, and cannot be detached from each other by human manual manipulation without using a tool. A bottom edge 208 of the screen 204 is configured to be held above the surface by a predefined height h. Referring to FIG. 2B, the base 202 is substantially hidden behind the screen 204 from the front view of the display assistant device 200. That said, the predefined height h is less than a predetermined threshold (e.g., 15 mm), such that the screen 204 appears to float in air and the base 202 can be substantially hidden behind the screen 204 from the front view of the display assistant device. In an example, the predetermined threshold is 10% of a width w of the screen 204. If the screen 204 is a seven-inch screen having a width of 5 inch, the bottom edge 208 of the screen 204 is held above the surface by a height of 12.7 mm or below.

Figure 2C:
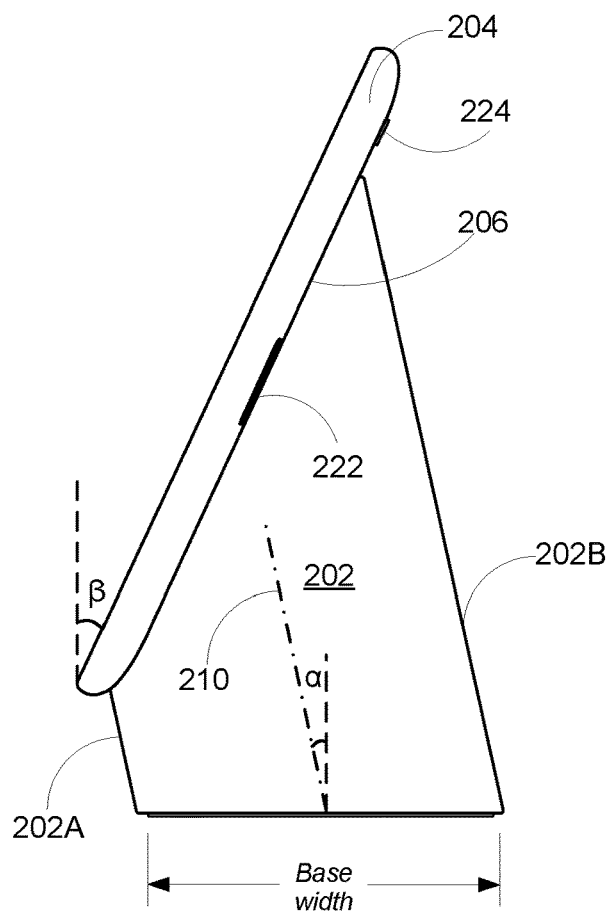

Referring to FIG. 2C, in some implementations, the base 202 extends along a central axis 210, and the central axis 210 of the base 202 is not perpendicular to the surface when the base 202 sits on the surface (which is substantially flat herein). Optionally, the base 202 has a front side 202A and a rear side 202B both of which are parallel with the central axis 210. The central axis 210, front side 202A and rear side 202B of the base 202 lean forward by a base angle α when the base sits on the surface. It is noted that the front side 202A of the base is shorter than the rear side 202B of the base, e.g., a height of the front side 202A is only 20% of that of the rear side 202B. When the screen 204 is supported by the base 202 at its rear surface 206, the screen 204 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 200 does not tip over (forward or backward) easily when a blunt force F hits a top edge of the display assistant device 200 or a user touch occurs to the screen 202 of the display assistant device 200.

The base 202 acts as a speaker box (i.e., an enclosure structure of one or more speakers). A rear speaker (e.g., 316 in FIGS. 3A and 3B) is concealed inside the base 202 and configured to project sound substantially towards the rear view of the display assistant device, i.e., to project sound out of the base 202 substantially via the rear side 202B of the base 202. In some implementations, the base 202 further conceals one or more front speakers (e.g., 320 in FIGS. 3A and 3B). Each front speaker faces the front view of the display assistant device 200 and is configured to project sound out of the base 202 substantially via the front side 202A of the base 202. That said, each front speaker projects the sound through a space of the predefined height h separating the bottom edge 208 of the screen 204 and the surface on which the display assistant device 200 is configured to sit. Further, in some implementations, the rear speaker includes a woofer speaker configured to produce first audio frequencies in a first frequency range, and each of the one or more front speakers includes a tweeter speaker configured to produce second audio frequencies in a second frequency range. The second audio frequencies of the front speakers are higher than the first audio frequencies of the rear speaker.

Referring to FIG. 2B, the display assistant device 200 has a substantially narrow bezel area surrounding an active display area of the screen 204. The bezel area is optionally white and has a bezel width less than a threshold width (e.g., a fixed value of 2 mm or % 5 of the screen width w). In some implementations, the active display area has a plurality of rounded corners. The rounded corners are formed when white paint is applied on a rear surface of a cover glass to define the active display area. In some implementations, an array of display pixels that are visible via a transparent portion of the cover glass are also rounded, i.e., a subset of display pixels that are outside the rounded corners are not driven to display any color and brightness information that varies with time.

In some implementations, the bezel area includes a subset of one or more microphone holes 212, an indicator window 214, a camera window 220 and a sensor window 216. One or more microphones 330 may be placed behind the microphone holes 212 and configured to collect sound from the ambient of the display assistant device 200. An indicator may be disposed behind the indicator window 214, and configured to provide a sequential lighting pattern to indicate whether the display assistant device 200 is active or inactive, whether the display assistant device 200 is mute or not, and/or a voice processing state (e.g., hot word detection, listening, thinking and speaking). A camera module 350 may be disposed behind the camera window 220 to capture a video stream of a field of view. An ambient light sensor 334 may be disposed behind the sensor window 216 and configured to detect a light condition in the smart home environment 100 where the display assistant device 200 sits.

Figure 2D:
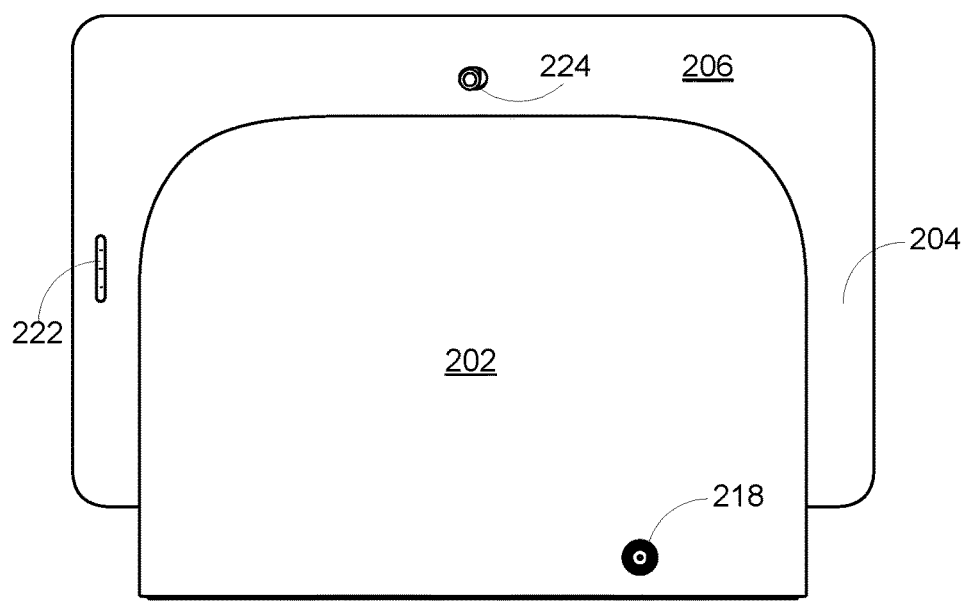

Referring to FIG. 2D, the display assistant device 200 further includes a volume control 222, a privacy control 224 and a power adaptor interface 218. In this example, the volume control button 222 and privacy control 224 are disposed on the rear surface 206 of the screen 204, and the power adaptor interface 218 is disposed on the rear side 202B of the base 202. The volume control 222 includes a mechanical assembly (e.g., a button, a knob, a switch) configure to receive a user input for adjusting a volume level of the speaker in the display assistant device 200. In an example, the volume control 222 includes two buttons (separated or connected) configured to initiate an increase or decrease of the volume level of the speaker, respectively. In some implementations, the two buttons of the volume control 222 can be pressed concurrently to reset the display assistant device 200, independently of controlling the volume level of the speaker. It is noted that the volume control 222 is not disposed on any edge of the screen 204 of the display assistant device 200. Rather, the volume control 222 is arranged on the rear surface 206 of the screen 204 and has a predefined distance from a short edge of the screen 204, such that when a user grabs the display assistant device 200 by the short edge of the screen 204, the volume control 222 is readily accessible for fingers of the user.

Further, the privacy control 224 disposed on the rear surface 206 is configured to provide privacy protection to a user of the display assistant device 200. For example, the privacy control 224 can mute one or more microphones 330 of the display assistant device 200, disables a camera if there is one in the display assistant device 200, disconnects the display assistant device 200 from the Internet while keeping the display assistant device 200 coupled in a local area network, and/or disconnects the display assistant device 200 from all communication networks available to the display assistant device 200. The type of privacy protection enabled by the privacy control 224 could change according to an identify of a person associated with the display assistant device 200 and/or or a time of a specific moment. In some implementations, when the privacy control 224 is turned on for privacy protection, it dynamically activates one of a group of privacy operations based on a user profile of a user who is identified as associated with the display assistant device 200 in real time (e.g., a person whose image or voice is captured and recognized by the display assistant device 200). Specifically, in an example, the display assistant device 200 has an owner mode, a family mode and a stranger mode each of which is associated with a unique subset of the group of privacy operations, and the user profile is associated with one of these three modes. Further, in some situations, in accordance with the user profile of the user, the one of the group of privacy operations associated with the display assistant device varies according to a time of a day. The display assistant device 200 may further collect user information (e.g., facial features, voice fingerprints and gestures) using a camera or a microphone and use the user information to identify the user who is associated with the display assistant device 200 in real time and retrieve the user profile of the user for the purposes of setting the type of privacy protection that can be enabled by the privacy control 224. More details on privacy control are explained with reference to PCT Patent Application No. PCT/US18/064449, filed Dec. 7, 2018, titled "Display Assistant Device," which is hereby incorporated by reference in its entirety.

In these implementations, the power adaptor interface 218 of the display assistant device 200 is disposed on the rear side 202B of the base 202. The power adaptor interface 218 includes a female connector to receive a male connector configured to connect the display assistant device 200 to an external power source (e.g., a direct current power source). In some implementations, the display assistant device 200 has to be constantly connected to the external power source, and is powered off when the external power source is disconnected. Alternatively, in some implementations, a power board is coupled to the power adaptor interface 218, and includes a rechargeable battery. The rechargeable battery is configured to be charged with the external power source, and drive the display assistant device 200 temporarily when the external power source is disconnected from the display assistant device 200.

A bottom surface of the base 202 constitutes a footprint of the display assistant device 200. A length of the bottom surface of the base 202 is smaller than a length of the screen 204, and a width of the bottom surface of the base 202 is significant smaller than a width w of the screen 204. As a result, the footprint of the display assistant device 200 is substantially small, and the display assistant device 200 can therefore fit into different physical settings (e.g., a kitchen, living room and bedroom) in the smart home environment 100. It is noted that FIGS. 2A-2D are focused on an overall look and mechanical features of the display assistant device 200. More details on functions of the display assistant device 200 are described with reference to International Patent Application No. PCT/US19/28601, filed Apr. 23, 2019, titled "Display Assistant Device," which is hereby incorporated by reference in its entirety.

Figure 3A:
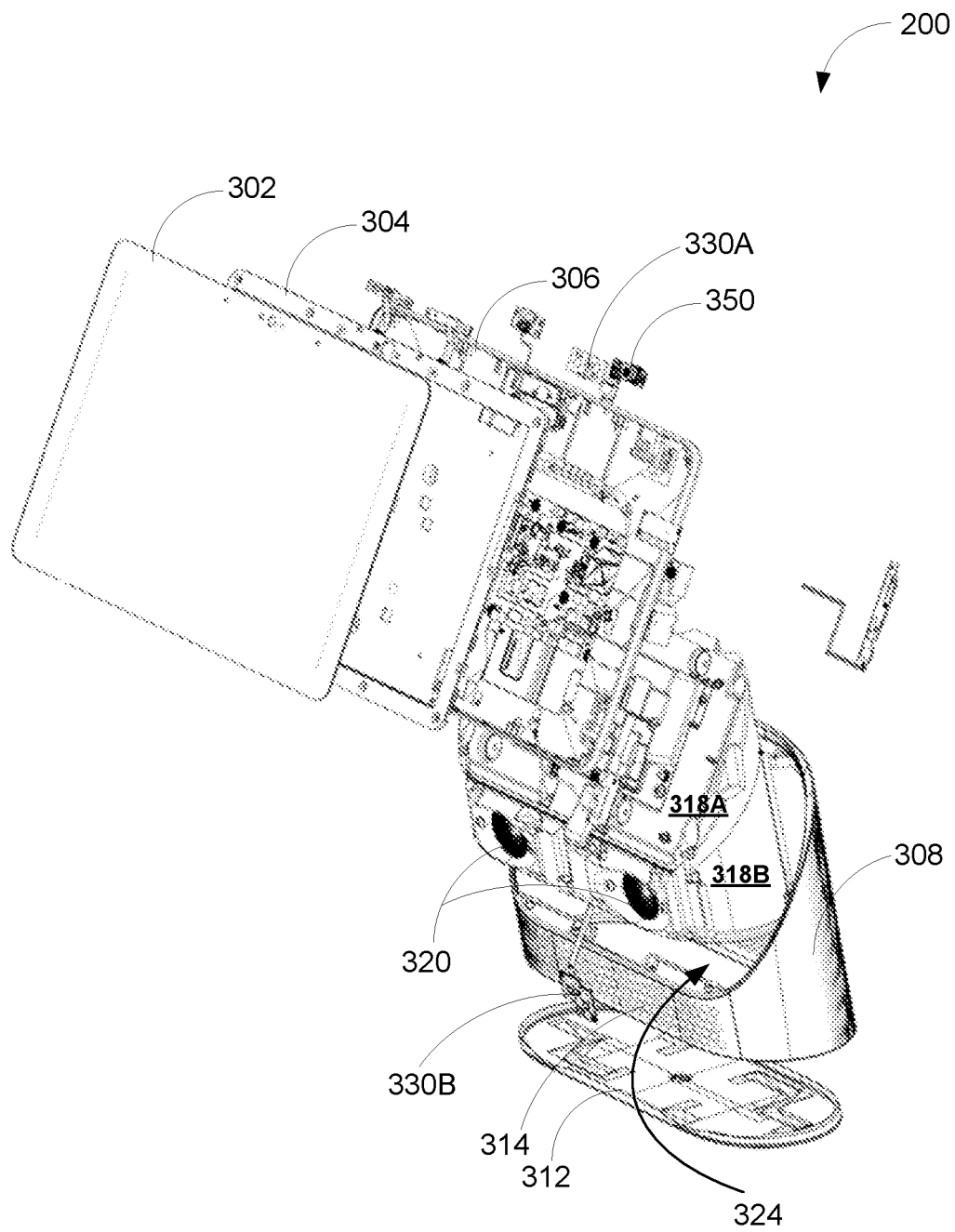
FIGS. 3A and 3B are two exploded views of a display assistant device 200 from a front perspective angle and a rear perspective angle in accordance with some implementations, respectively.
Figure 3B:
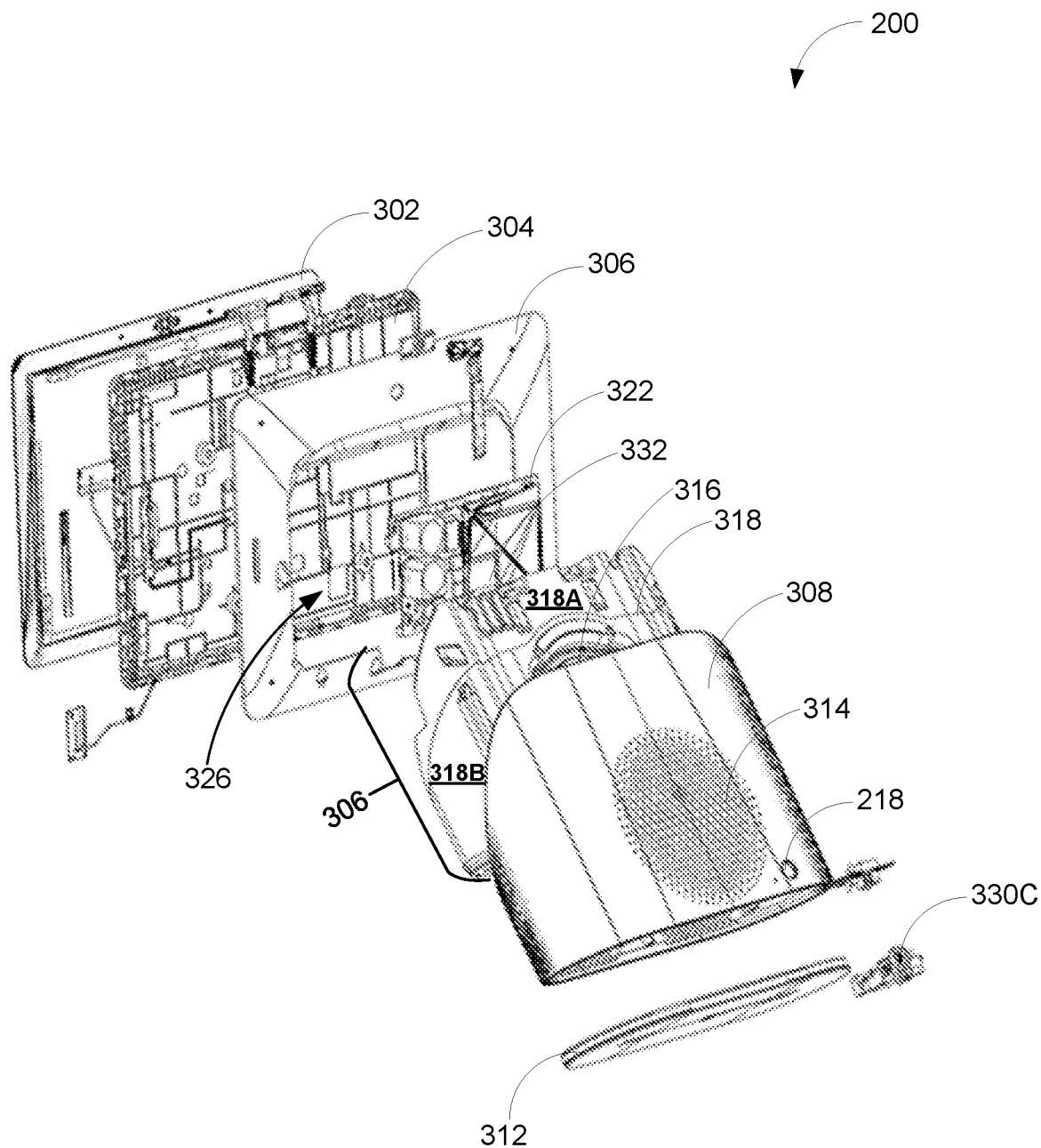

FIGS. 3A and 3B are two exploded views of a display assistant device 200 from a front perspective angle and a rear perspective angle in accordance with some implementations, respectively. The display assistant device 200 includes a base 202 and a screen 204. The screen 204 of the display assistant device 200 includes a display front 302, a middle frame 304 and a back cover 306. The display front 302 is coupled to a display module that is configured to provide backlight sources and drive individual display pixels of the display front 302. The display front 302 and the middle frame 304 are mechanically coupled to each other using an adhesive that is optionally applied adjacent to edges of the display front 302 and middle frame 304. In some implementations, a front surface of the display front 302 has (1) a display active area for presenting information and content and (2) a touch sensing area that is sensitive to touch events. The touch sensing area encloses the display active area and extends beyond the display active area around edges of the display active area.

In some implementations, a thermal spreader can be placed between and comes into contact with the display front 302 and middle frame 304 for redistributing heat generated by a display panel of the display front 302. The display front 302 has a rear surface made of conductive material (e.g., a metal plate), and when the thermal spreader comes into contact with a portion of (e.g., half of) the rear surface of the display front 302, it redistributes heat evenly across itself and the portion of the rear surface of the display front 302, thereby avoiding formation of hot spots on the display front 302. In an example, the thermal spreader includes a graphite sheet.

The base 202 of the display assistant device 200 includes a housing 308, a speaker assembly 310 and a base mount plate 312. The housing 308 encloses the speaker assembly 310, and includes a plurality of speaker grill portions 314 that permit sound generated by the speaker assembly 310 to exit the housing 308 of the base 202. Referring to FIG. 3B, the speaker assembly 310 includes at least a rear speaker 316 mounted in an enclosure structure 318. The rear speaker 316 includes a speaker opening that is exposed from the enclosure structure 318 and faces towards the rear side 202B of the base 202. The enclosure structure 318 provides a sealed enclosure for a rear portion of the rear speaker 316 near the front side 202A of the base 202. The speaker opening of the rear speaker 316 faces backward while being tilted upward with a tilting angle (e.g., angle $\lambda_1$ in FIG. 4), such that the rear speaker 316 is configured to project a substantial portion of sound generated by the rear speaker 316 backward to exit the housing 308 of the display assistant device 200 via the rear side 202B of the base 202.

Referring to FIG. 3A, in some implementations, the speaker assembly 310 one or more front speakers 320 embedded into the enclosure structure 318. Optionally, each of the one or more front speakers 320 is individually packaged and has its separate sealed enclosure integrated into the enclosure structure 318. Optionally, the enclosure structure 318 includes a distinct sub-structure configured to provide a respective sealed enclosure for each of the one or more front speakers 320. Each front speaker 320 faces a space of the predefined height h that is configured to separate the bottom edge 208 of the screen 204 and a surface on which the display assistant device 200 sits. In some implementations, a respective speaker opening of each front speaker 320 has a dimension substantially greater than the predefined height h of the space and faces forward while being tilted downward with a tilting angle (e.g., angle $\lambda_2$), such that the respective front speaker 320 is configured to project a substantial portion of sound generated by the respective front speaker 320 forward and towards the space between the bottom edge of the screen 204, thereby allowing the generated sound to exit the housing 308 of the display assistant device 200 via the front side 202A of the base 202. Alternatively, in some implementations, the dimension of the respective speaker opening of each front speaker 320 is comparable with the predefined height h of the space, i.e., a projection of the dimension to the predefined height h is substantially equal to the predefined height h.

In some implementations, the enclosure structure 318 is configured to guide part of the sound generated by the front speakers 320 and the rear speaker 316 further towards different areas of the housing 308. Specifically, for example, the plurality of speaker grill portions 314 of the housing 308 are distributed on at least a front side, a rear side, a left side and a right side of the housing, and therefore, the sound generated by the speakers 316 and 320 is guided inside the housing by the enclosure structure 318 to exit the housing 308 from its front, rear, left and right sides.

The enclosure structure 318 of the rear speaker 316 includes an upper portion 318A and a base portion 318B. The rear speaker 316 is mounted in the base portion 318B, and the speaker opening of the rear speaker 316 is exposed on a rear surface of the base portion 318B. The upper and base portions 318A and 318B jointly provides a sealed enclosure for a rear portion of the rear speaker 316. The upper portion 318A is electrically conductive. One or more electronic components 332 are coupled to the upper portion 318A, such that the upper portion 318A at least partially provides electromagnetic shielding for the one or more electronic components while forming part of the sealed enclosure of the rear speaker 316. In some implementations, the one or more electronic components 332 is also thermally coupled to the upper portion 318A which acts as a heat sink to absorb heat generated by the one or more electronic components and dissipate the generated heat away from the electronic components 332. In some implementations, the one or more electronic components 332 are mounted on a rear surface of the main logic board 322. A conductive plane (e.g., 610 in FIG. 6C) disposed in a substrate of the main logic board 322 is grounded to provide electromagnetic shielding for the electronic components 332 jointly with the upper portion 318A. More details on a multi-function speaker enclosure 318 are described below with reference to FIG. 5-7 of this application.

In some implementations, the housing 308 is covered by a fabric, and the plurality of speaker grill portions 314 are concealed behind the fabric. Stated another way, the plurality of speaker grill portions 314 are not visible to a user of the display assistant device 200 from an exterior look. Optionally, the fabric is secured to the housing 308 by a thermally activated adhesive that is applied in selective areas as to prevent the fabric from moving during speaker operation and also not occlude sound output. In some implementations, the fabric may be tensioned over the housing and held in place by mechanical clamping. The fabric is cut open at the power adapter interface 218, and wrapped around a circular edge of the power adapter interface 218.

In some implementations, the base 202 further includes a power board that is also contained within the housing 308. In some embodiments, the power board is embedded in a rear portion of the enclosure structure 318 and aligned with the power adapter interface 218, when the enclosure structure 318 is assembled into the base 202. The power board is electrically coupled to the power adaptor interface 218 exposed on the rear side 202B of the base 202 to access an external power source, while it is also electrically coupled to a main logic board 322 of the display assistant device 200 via a flexible printed circuit board (PCB) or interconnect cable. By these means, the power board is configured to drive the main logic board 322 of the display assistant device 200 with the external power source.

The front side 202A of the housing 308 is shorter than the rear side 202B of the housing 308, e.g., a height of the front side 202A is only 20% of that of the rear side 202B, such that the housing 308 has a tilted opening 324 on its top. The tilted opening 324 is mechanically coupled to the rear surface 206 of the screen 204. The back cover 306 has a back opening 326, and the tilted opening 324 of the base 202 is aligned with the back opening 326 of the back cover 306, thereby allowing interconnects to connect electronic components (e.g., a display module) mounted in the screen 204 to the main logic board 322. When the screen 204 and the base 202 are mechanically coupled, a central portion of the rear surface 206 of the screen 204 is covered by the base 202. Optionally, the central portion of the rear surface 206 covered by the base 202 accounts for 20-70% of an entire area of the rear surface 206. In some implementations, to assemble the back cover 306 to the base 202, each edge of the back opening 326 of the back cover 306 is fastened to an interior surface of the housing 308 via one or more fasteners (e.g., screws). For example, top and bottom edges of the back opening 326 of the back cover 306 are fastened to interior rear and front surfaces of the housing 308, respectively.

The base mount plate 312 is made of flexible material, and is mechanically coupled to a body of the base 202 (e.g., a bottom portion of the speaker assembly 310) via at least an edge of the base mount plate 312 (e.g., a peripheral edge surrounding the base mount plate 312). In some implementations, the edge of the base mount plate 312 included a raised portion configured to wrap around the edge of the body of the base 202 to which the base mount plate 312 is attached. The edge of the body of the base 202 optionally has a holding structure to couple to the raised portion the base mount plate 312, thereby facilitating the edge of the base mount plate 312 to hold onto the body of the base 202. In some implementations, the base mount plate 312 is made of an anti-slip material (e.g., silicone) and has a bottom surface that has a predefined friction coefficient with the surface on which the display assistant device 200 is configured to sit. The predefined friction coefficient is greater than a threshold friction coefficient such that the base 202 can sit on the surface tightly. Optionally, the bottom surface of the base mount plate 312 has a substantially concave shape that recesses slightly towards the body of the base 202.

Further, in some implementations, the base mount plate 312 further includes a top surface opposing the bottom surface. The top surface of the base mount plate 312 includes a plurality of stud fasteners configured to mate with a plurality of receiving fasteners on the bottom surface of the body of the base 202 (e.g., a bottom surface of the enclosure structure 318). It is also noted that positions of the stud fasteners and the receiving fasteners can be swapped in some implementations, i.e., the top surface of the base mount plate 312 includes a plurality of receiving fasteners configured to mate with a plurality of stud fasteners on the bottom surface of the body of the base 202. Alternatively, in some implementations, the base mount plate 312 is coupled to the body of the base 202 using an adhesive.

In some embodiments, the plurality of stud fasteners includes a first stud (also called a reference stud fastener) configured to match a first receiving fastener (also called a reference receiving fastener) with a first tolerance and a second stud (also called an adjustable stud fastener) configured to match a second receiving fastener (also called an adjustable receiving fastener) with a second tolerance. The first tolerance is smaller than a threshold tolerance and the second tolerance is larger than the firs tolerance. That said, when the base mount plate 312 is being assembled onto the body of the base 202, the first stud is snapped onto the first receiving fastener before the second stud is snapped onto the second receiving fastener with its position adjusted within the second tolerance.

Figure 4:
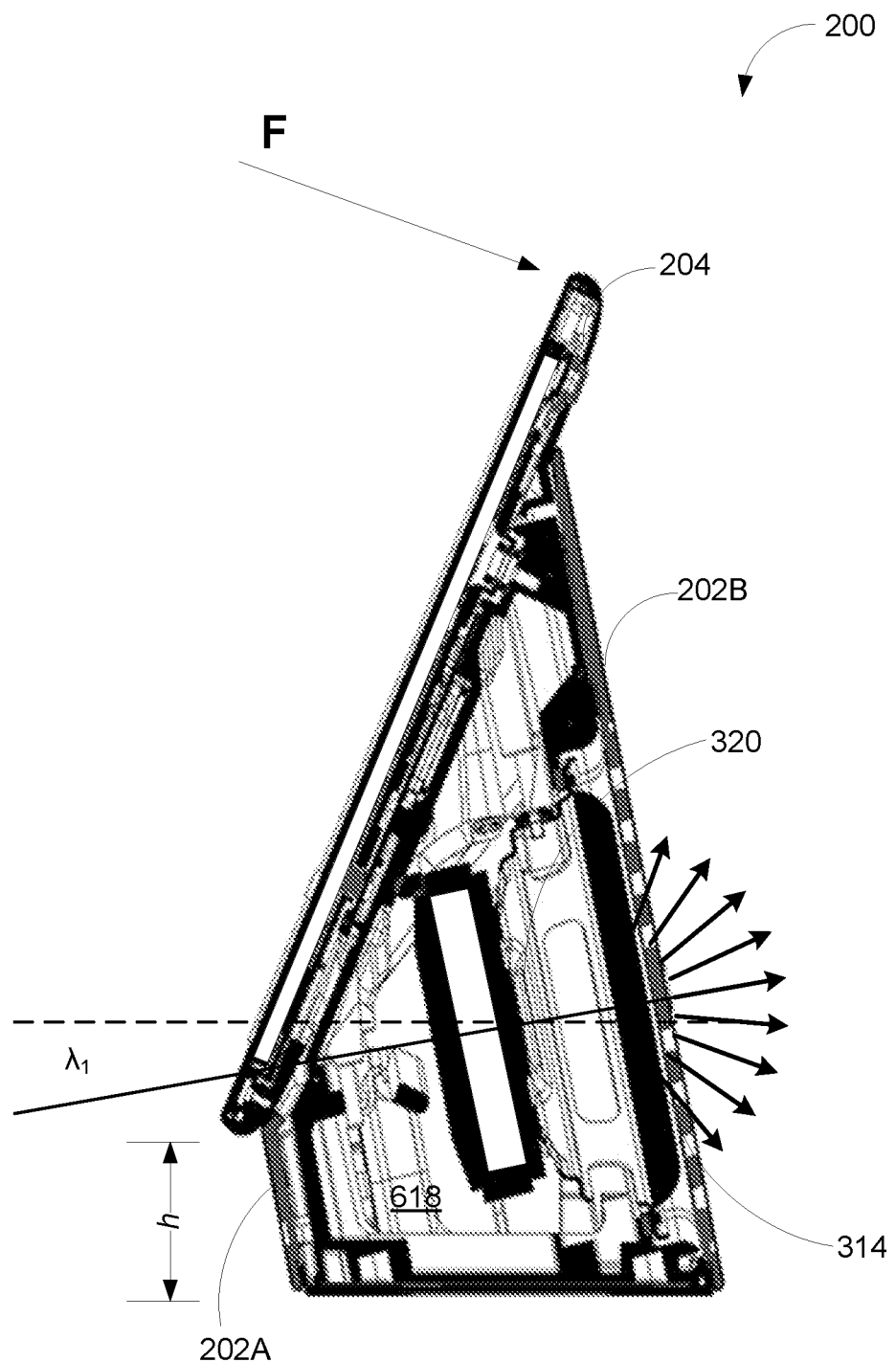
FIG. 4 is a cross sectional view of a display assistant device in accordance with some implementations.

FIG. 4 is a cross sectional views of a display assistant device 200 in accordance with some implementations. The display assistant device 200 includes a speaker assembly 310, and the speaker assembly 310 further includes a rear speaker 316 and one or more front speakers 320 (optional). The enclosure structure 318 provides a sealed structure for a rear portion of the rear speaker 316 while a speaker opening of the rear speaker 316 is exposed from a rear surface of the enclosure structure 318. Stated another way, the enclosure structure 318 directly prevents sound waves projected into the rear portion of the rear speaker 316 by a diaphragm of an open speaker driver of the rear speaker 316 from interacting with (i.e., interfering with) sound waves projected towards the speaker opening of the rear speaker 316. The speaker opening of the rear speaker 316 faces backward and is optionally tilted upward with a tilting angle $\lambda_1$.

The enclosure structure 318 optionally provides a sealed structure for a rear portion of each front speaker 320 while a speaker opening of the respective front speaker 320 is exposed from a front surface of the enclosure structure 318. That said, part of the enclosure structure 318 directly prevents sound waves projected into the rear portion of the front speaker 320 by a diaphragm of an open speaker driver of the front speaker 320 from interacting with (i.e., interfering with) sound waves projected towards the speaker opening of the front speaker 320.

Alternatively, in some implementations, each front speaker 320 may not rely on the enclosure structure 318 to provide the sealed structure. Rather, the front speaker 320 is individually packaged and mechanically integrated into the enclosure structure 318, and the enclosure structure 318 provides mechanical support to the front speaker 320 without controlling the sound waves projected by the front speaker 320. In some implementations, a speaker opening of each front speaker 320 has a dimension substantially greater than or matches a predefined height h of the space separating a bottom edge of the screen 204 and the surface on which the display assistant device 200 is configured to sit. The speaker opening of each front speaker 320 faces forward and is optionally tilted downward with a tilting angle $\lambda_2$. In some implementations, the tilting angles $\lambda_1$ and $\lambda_2$ are equal. Further, in some implementations, the tilting angles $\lambda_1$ and $\lambda_2$ are equal to the base angle $\alpha$ and the screen angle $\beta$ (which, for example, are equal to 15 degrees).

The rear speaker 316 is configured to project sound substantially towards a rear view of the display assistant device 200, i.e., project a substantial portion of sound generated by the rear speaker 316 out of the base 202 via its rear side 202B. In contrast, each front speaker 320 (if any) is configured to project sound substantially towards a front view of the display assistant device 200, i.e., project a substantial portion of sound generated by the respective speaker 320 towards the space between the bottom edge of the screen 204 and the surface. A housing 308 of the base 202 includes a plurality of speaker grill portions disposed on one or more of a front side 202A, a rear side 202B, a left side and a right side of the base 202. In some implementations, a substantial portion (e.g., 40% or more) of the sound generated by the front speaker 320 or rear speaker 316 exits the base 202 via speaker grill portions on the front side 202A or rear side 202B of the base 202, respectively. Remaining portions of the sound generated by the front/rear speaker are guided inside the housing 308 to exit the base 202 via a subset of speaker grill portions that are disposed on one or more of the rear/front side, left side and right side of the base 202.

The speakers 316 and/or 320 are disposed in a lower portion of a base 202 to lower down a center of mass of the entire display assistant device 200 which, for example, is lower than a predetermined portion (e.g., one third) of a height of the display assistant device 200. In some implementations, for the purposes of lowering down the center of mass, a speaker assembly 310 having a larger weight is selected over a speaker assembly having a smaller weight when their costs or speaker box volumes are comparable. For example, a rear speaker 316 has a volume of 120cc, and a Ferrite based speaker is selected over a Neodymium based speaker because of its weight advantage. Given its center of mass and weight, the display assistant device 200 does not tip over (forward or backward) easily when a blunt force F hits a top edge of the display assistant device 200 or a user touch occurs to the screen 204 of the display assistant device 200. For example, the center of mass is configured so that the display assistant device 200 can sustain an impact force of 20 Newton without tipping over.

In some implementations not shown in FIG. 4, the enclosure structure 318 includes two shoulders each of which is recessed and separated from the housing 308 by a respective sound space, and the sound projected from the rear speaker 316 is configured to be guided through the sound spaces to exit the base 202 from one or both of the speaker grill portions located on the left and right sides of the housing 308 (not shown in FIG. 4). In some implementations, the two shoulders of the enclosure structure 318 have different shapes, e.g., have a hyperbolic shape and a parabolic shape, respectively. In some implementations, the sound spaces are created to eliminate air disturbance associated with the sound that exits the base 202 via the rear side of the housing 308 and thereby reduce noise in the sound broadcasted from the rear speaker 316. Likewise, sound spaces can be created to guide the sound projected from the front speaker 320 to the right and/or left sides of the housing 308. More details on the speaker assembly 310 of the display assistant device 200 are discussed with reference to PCT Patent Application No. PCT/US18/64536, filed Dec. 7, 2018, titled "Speaker Assembly of a Display Assistant Device," which claims priority to U.S. Provisional Patent Application No. 32/743, 464, filed Oct. 9, 2018, titled "Speaker Assembly of a Display Assistant Device," each of which is hereby incorporated by reference in its entirety.

Figure 5A:
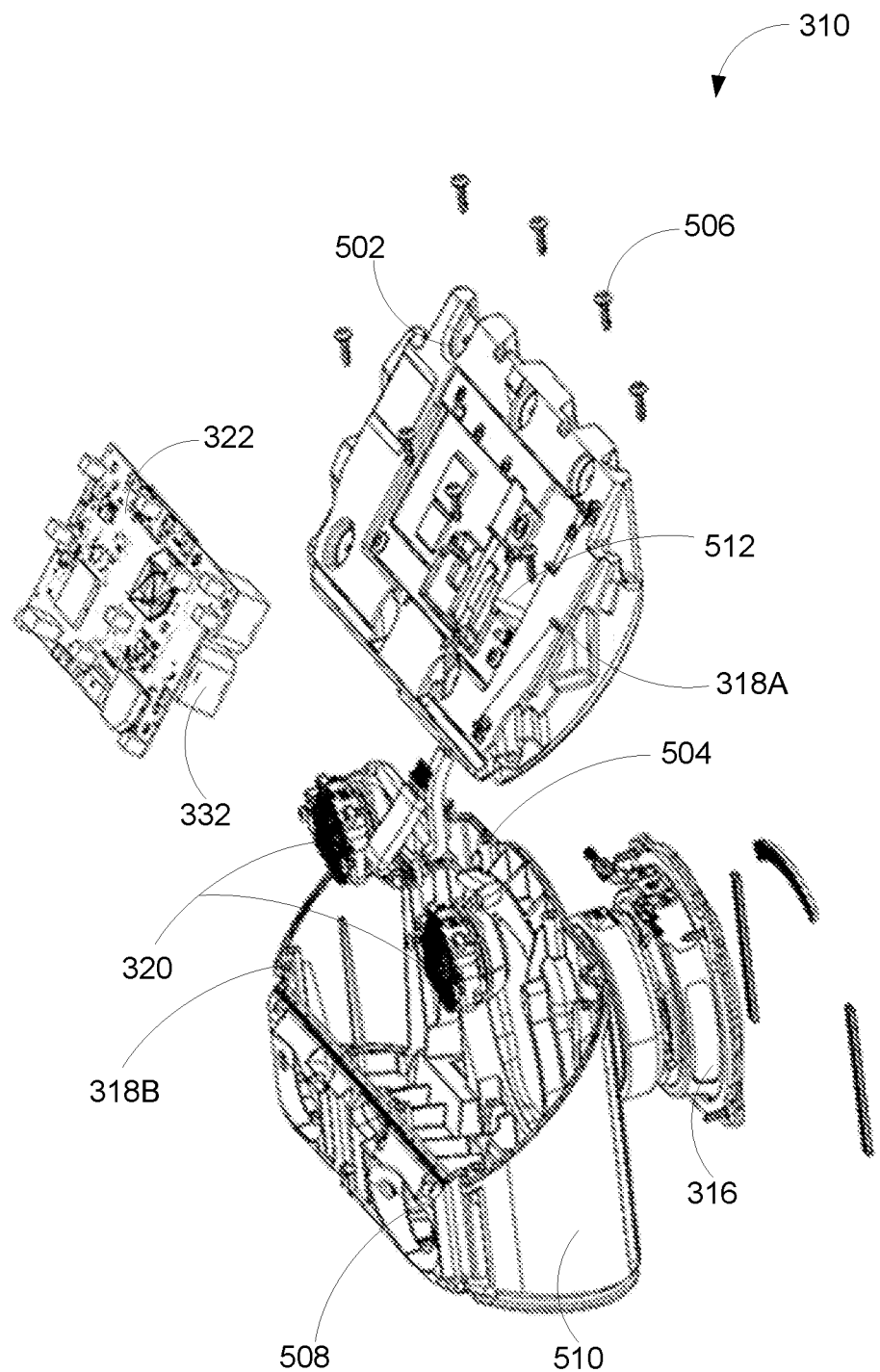
FIGS. 5A and 5B are two exploded views of a speaker assembly of a display assistant device from a front perspective angle and a rear perspective angle in accordance with some implementations, respectively.
Figure 5B:
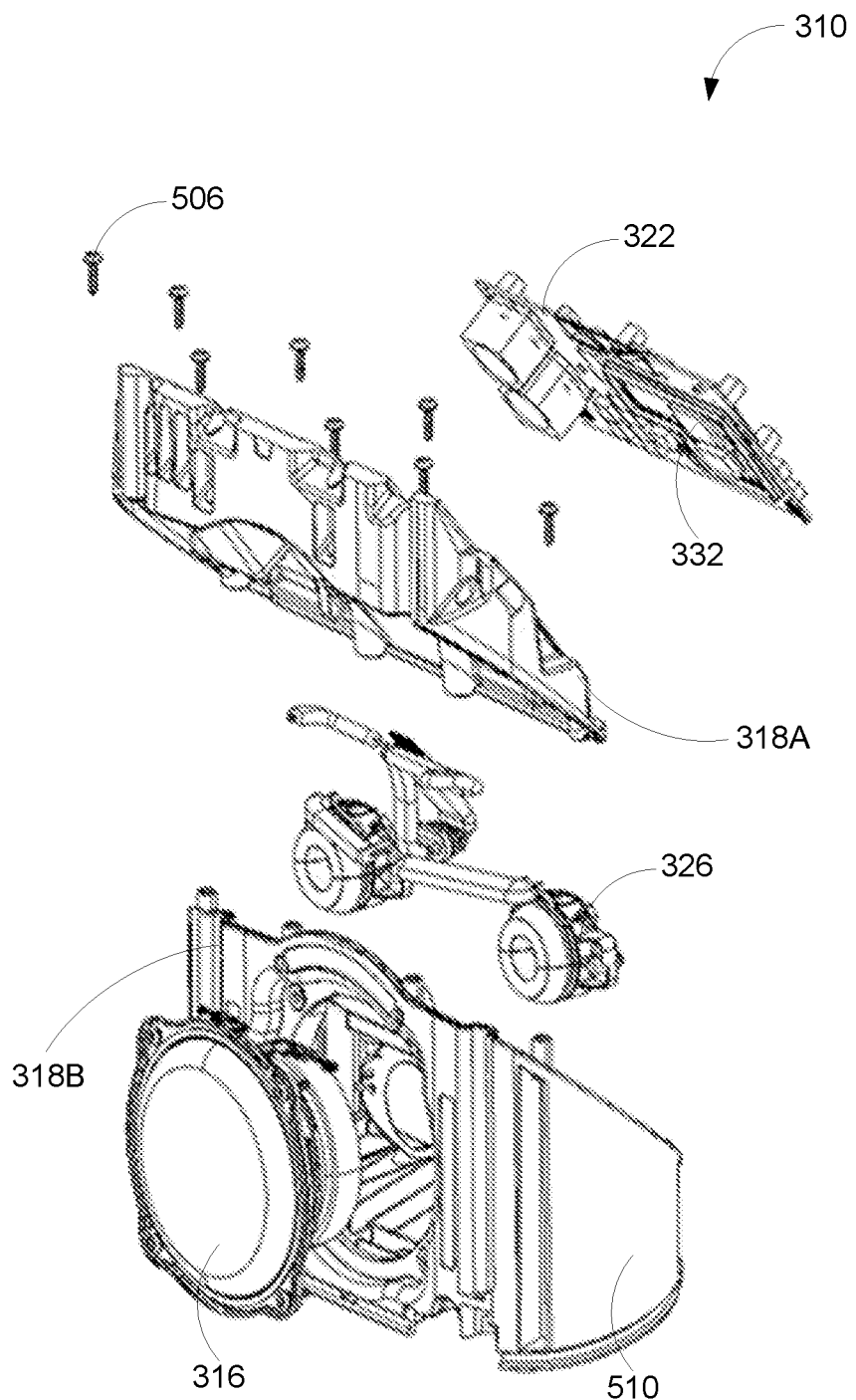

FIGS. 5A and 5B are two exploded views of a speaker assembly 310 of a display assistant device 200 from a front perspective angle and a rear perspective angle in accordance with some implementations, respectively. The speaker assembly 310 includes a rear speaker 316, two front speakers 320 and an enclosure structure 318 of the rear speaker 316. The enclosure structure 318 further includes an upper portion 318A and a base portion 318B. The base portion 318B is configured to hold the front and rear speakers. The upper and base portions 318A and 318B includes a first plurality of fastener structures 502 and a second plurality of fastener structures 504 that are complementary to each other. The upper portion 318A is mechanically coupled to the base portion 318B via the fastener structures 502 and 504 (e.g., coupled to each other via fasteners 506), thereby forming a sealed enclosure for the rear speaker 316. Specifically, an open speaker driver of the rear speaker 316 is mounted on a rear surface of the enclosure structure 318, and a speaker opening of the rear speaker 316 faces backward to a rear view of the display assistant device 200. The enclosure structure 318 directly prevents sound waves projected into a rear portion of the rear speaker 316 by a diaphragm of the open speaker driver of the rear speaker 316 from interacting with (i.e., interfering with) sound waves projected towards the speaker opening of the rear speaker 316. In some implementations, the upper portion 318A has an internal surface that is configured to control the sound waves projected into the rear portion of the rear speaker 316 directly. In some implementations (not shown in FIGS. 5A and 5B), the base portion 318B includes a sealed enclosure by itself when the open speaker driver of the rear speaker 316 is mounted on its rear surface, and the upper portion 318A is attached to the base portion 318B without controlling the sound waves projected into the rear portion of the rear speaker 316.

The one or more front speakers 320 face a front view that is opposite to the rear view that the rear speaker faces. In some implementations, each front speakers 320 is not individually packaged and relies on the base portion 318B to provide a front enclosure 508. The front enclosure 508 is separated from the sealed enclosure that controls the sound waves generated by the rear speaker 316. An open speaker driver of the respective front speaker 320 is disposed in the front enclosure 508 to seal the front enclosure 508. The front enclosure 508 is configured to constrain sound waves projected backward by a diaphragm of the open speaker driver of the respective front speaker 320 within the front enclosure 508 and thereby separate it from sound waves projected forward by the diaphragm. That said, the enclosure structure 318 includes a plurality of separated sealed spaces each of which provides a respective sealed enclosure for one of the front and rear speakers 320 and 316.

Alternatively, in some implementations, each front speakers 320 is individually packaged and integrated into the base portion 318B of the enclosure structure 318, i.e., has its own sealed enclosure for separating the sound waves projected forward from sound waves projected backward by the diaphragm of the open speaker driver of the respective front speaker 320. In some situations, the base portion 318B has a front enclosure 508 for each front speaker 320. The front enclosure 508 is separated from the sealed enclosure for controlling the sound waves generated by the rear speaker 316. The front enclosure 508 is configured to receive the respective front speaker 320, allowing the respective front speaker 320 to face forward when disposed in the front enclosure 508.

Alternatively, in some situations, the base portion 318B has a front opening 508 for each front speaker 320. The front opening 508 is connected to the sealed enclosure for controlling the sound waves generated by the rear speaker 316. The front opening 508 is sealed when the respective front speaker 320 that is individually packaged is disposed therein.

In some implementations, a side wall 510 of the enclosure structure 318 comes into contact with an interior surface of a housing 308 when the enclosure structure 318 is assembled into the housing 308. Alternative, in some implementations, a sound space is created between the side wall 510 of the enclosure structure 318 and the interior surface of the housing 308 to modulate sound projected from the corresponding front speaker 320 or rear speaker 316. The sound space may be separated to two sound spaces to modulate the sound projected from the corresponding front speaker 320 and rear speaker 316 separately. In an example, the side wall 510 of the enclosure structure 318 has one of a hyperbolic shape and a parabolic shape. It is noted that the side walls 510 on two different sides (also called shoulders) of the enclosure structure 318 may have the same shape or distinct shapes.

The upper portion 318A is configured to support a main logic board 322 of the display assistant device 200. A plurality of electronic components 332 are mounted on both sides of the main logic board 322. The upper portion 318A includes a recess 512 configured to receive one or more of the electronic components 332 that are mounted on and rises from a rear surface of the main logic board 322. In accordance with some implementations of the application, the upper portions 318A is made of an electrically conductive material, and at least partially provides electromagnetic shielding for a subset of the electronic components 332 while forming part of the sealed enclosure of the rear speaker 316. In some implementations, the subset of the electronic components 332 is also thermally coupled to the upper portion 318A which acts as a heat sink to absorb heat generated by the one or more electronic components and dissipate the generated heat away from the electronic components 332. By these means, the upper portion 318A can serves dual or triple purposes (i.e., acts as two or more of a sealed enclosure of the rear speaker, an electromagnetic shield and a heat sink) in the display assistant device 200. More details on electromagnetic shielding and heat dissipating functions of a multi-function speaker enclosure 318 are described below with reference to FIG. 6A-6C and 7, respectively.

Figure 6A:
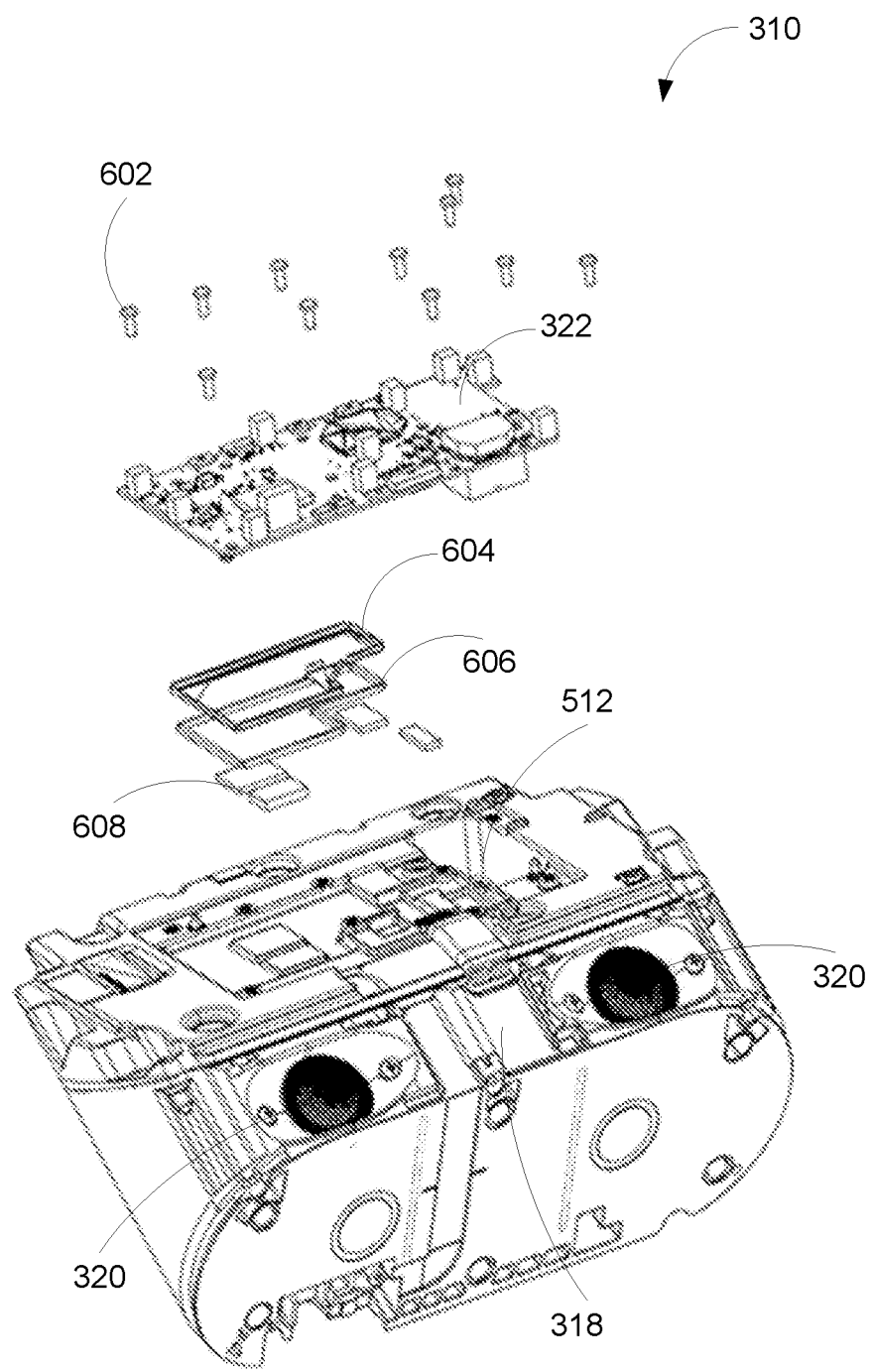
FIGS. 6A and 6B are two exploded views of a speaker assembly of a display assistant device having an electrically conductive portion from a front perspective angle and a rear perspective angle in accordance with some implementations, respectively.
Figure 6B:
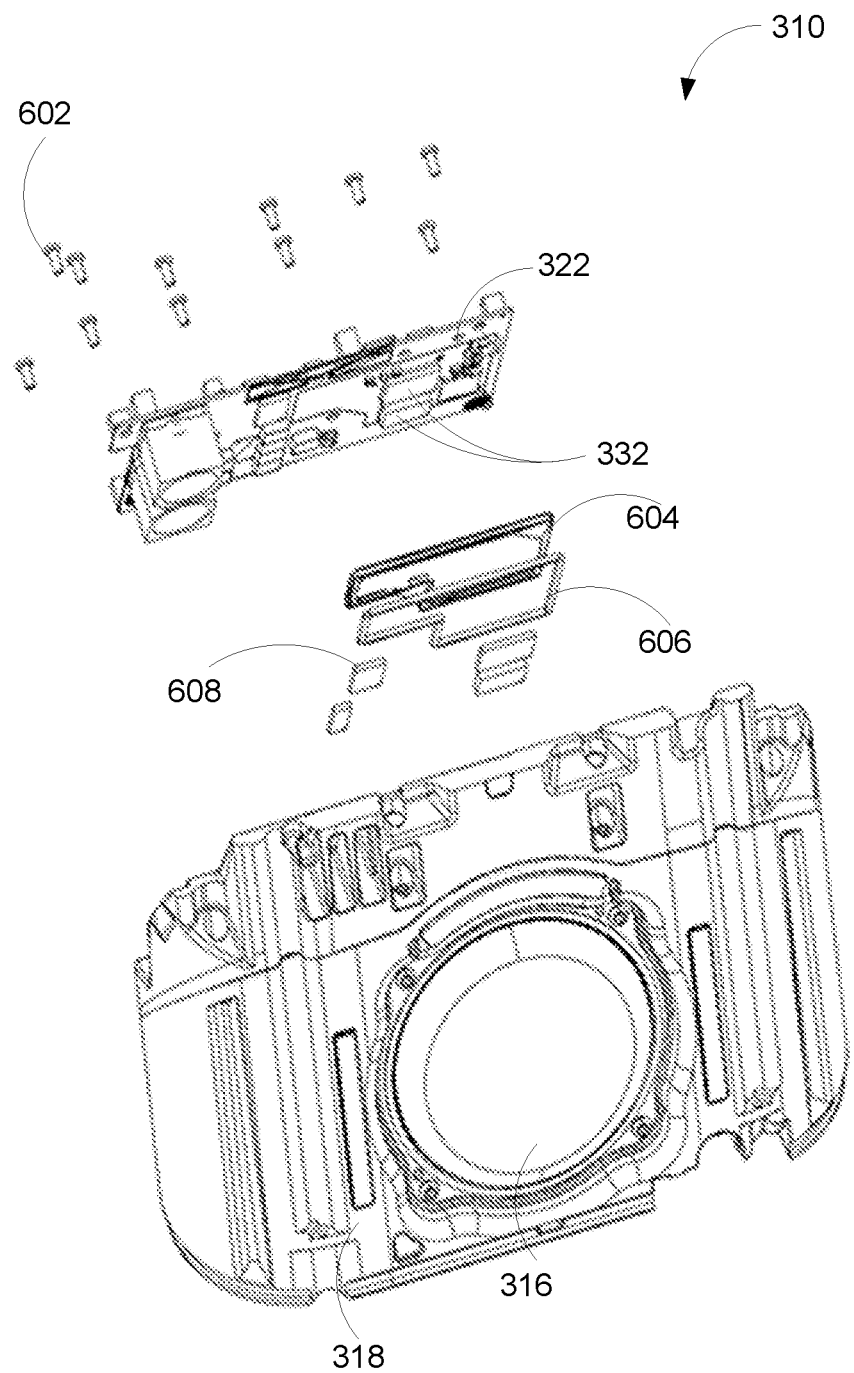
Figure 6C:
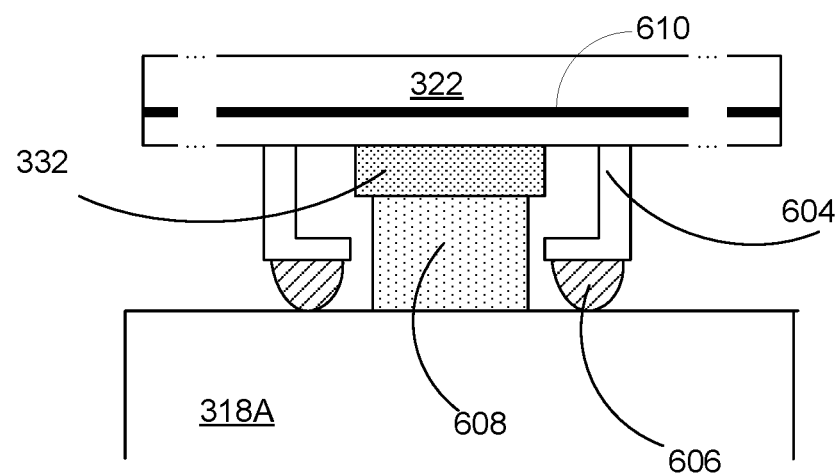
FIG. 6C is a cross-sectional view of electrical shielding that is provided by the speaker assembly of the display assistant device in FIGS. 6A and 6B in accordance with some implementations.

FIGS. 6A and 6B are two exploded views of a speaker assembly 310 of a display assistant device 200 having an electrically conductive portion (i.e., an upper portion 318A) from a front perspective angle and a rear perspective angle in accordance with some implementations, respectively. As explained above, the upper portion 318A that is electrically conductive is configured to provide electromagnetic shielding for one or more electronic components 332. FIG. 6C is a cross-sectional view of electrical shielding that is provided by the speaker assembly 310 of the display assistant device 200 in FIGS. 6A and 6B in accordance with some implementations.

In some implementations, the one or more electronic components 332 are mounted on a rear surface of the main logic board 322, and the main logic board 322 is mounted on the upper portion 318A of the enclosure structure 318, thereby allowing the one or more electronic components 332 to be mechanically coupled to the upper portion 318A of the enclosure structure 318 via the main logic board 322. Specifically, the upper portion 318A has a slanted top surface, and the main logic board 322 are attached to the slanted top surface of the upper portion 318 via a plurality of fasteners 602. The upper portion 318A of the enclosure structure 318 includes a recess 512 configured to receive the one or more electronic components 332 when the main logic board 322 is mounted on the upper portion 318A of the enclosure structure 318. That said, the one or more electronic components 332 located on the rear surface of the main logic board 322 descend into and are concealed in the recess 512 when the main logic board 322 is mounted on the upper portion 318A of the enclosure structure 318.

In some implementations, the main logic board 322 further includes a grounded plane 610 that is electrically coupled to the electrically conductive upper portion 318A to provide the electromagnetic shielding that encloses the one or more electronic components 332. Specifically, in an example, both the grounded plane 610 of the main logic board 322 and the upper portion 318A are electrically coupled to a ground of the display assistant device 200, such that the one or more electronic components 332 is immersed in a grounded local environment and protected from electromagnetic interference. In some situations, the recess 512 is physically configured according to a profile of the one or more electronic components 332 mounted on the rear surface of the main logic board 322, and the one or more electronic components 332 are closely surrounded by the ground of the display assistant device 200.

Referring to FIG. 6C, in some implementations, the one or more electronic components 332 are surrounded by an electromagnetic shielding fence 604 fixed on the main logic board 322. A flexible electrically conductive foam 606 is disposed on top of the electromagnetic shielding fence 604. Optionally, the flexible electrically conductive foam 606 includes a conductive string bent to align with the electromagnetic shielding fence 604. Optionally, the flexible electrically conductive foam 606 includes a conductive sheet covering a top of the electromagnetic shielding fence 604. When the main logic board 322 is mounted on the upper portion 318A of the enclosure structure 318, the upper portion 318A of the enclosure structure 318 is pressed onto the flexible electrically conductive foam 606 and electrically coupled to the electrically conductive shielding fence 604 via the flexible electrically conductive foam 606, thereby forming the electrical fielding that closely encloses the one or more electronic components 332.

In some implementations, a subset of the electronic components 332 (not each and every electronic component 332) disposed on the rear surface of the main logic board 322 is protected by the electromagnetic shielding fence 604 and flexible electrically conductive foam 606. Each electromagnetic shielding fence 604 is optionally contains a single electronic component 332 that is sensitive to electromagnetic interference or two or more of these sensitive electronic components 332.

Figure 7:
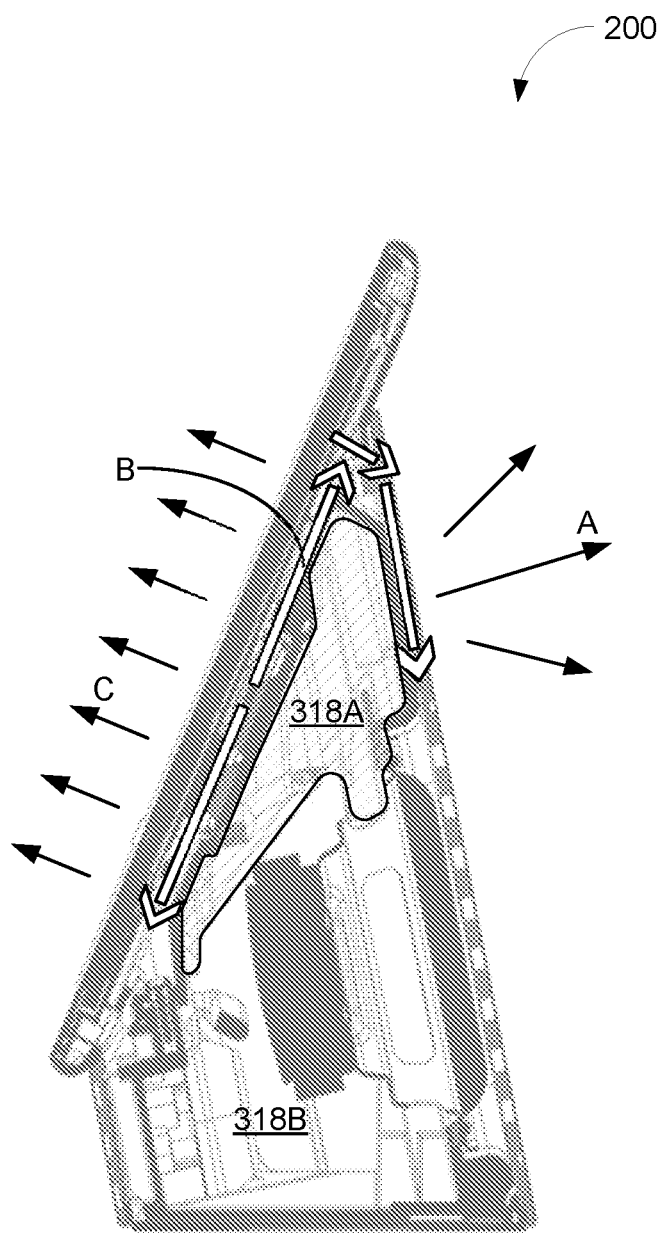
FIG. 7 is a cross sectional view of a display assistant device in which part of an enclosure structure of a speaker assembly acts as a heat sink in accordance with some implementations, respectively.

FIG. 7 is a cross sectional view of a display assistant device 200 in which part of an enclosure structure 318 of a speaker assembly 310 acts as a heat sink in accordance with some implementations, respectively. In some implementations, the upper portion 318A of the enclosure structure 318 is not only electrically conductive, but also thermally conductive. The upper portion 318A of the enclosure structure 318 is thermally coupled to one or more first electronic components 332, and is configured to absorb heat generated by the one or more first electronic components 332 and dissipate the generated heat away from the one or more first electronic components 332. Under some circumstances, referring to FIG. 6C, the one or more first electronic components 332 are mounted on a rear surface of the main logic board 322, and the upper portion 318A of the enclosure structure 318 and the one or more first electronic components 332 are thermally coupled to each other via a thermal spreader 608 to facilitate heat transfer from the first electronic components 332 to a body of the upper portion 318A.

In accordance with a first heat dissipation path A, the heat absorbed by the upper portion 318A of the enclosure structure is then dissipated via the rear side 202B of the base 202 of the display assistant device 200. In some implementations, the upper portion 318A of the enclosure structure 318 is hollow, and the heat absorbed by the upper portion 318 is transferred along a surface of the enclosure structure 318. In some implementations, a first thermal conductive pad is disposed between the upper portion 318A of the enclosure structure 318 and the rear side of the base 202 to facilitate heat transfer from the upper portion 318 to the rear side of the base 202. Alternatively, in some implementations, an air gap exists between the upper portion 318A of the enclosure structure 318 and the rear side of the base 202. The sound waves projected from the rear speaker 316 are configured to facilitate transferring the heat to the rear side of the base 202 and carry the heat out of the housing 308 of the base 202 of the display assistant device 200.

Part of the heat generated by the first electronic components 332 is absorbed by a substrate of the main logic board 322 itself, while part of heat is generated by one or more second electronic components 332 mounted on a front surface of the main logic board 322 and absorbed by the substrate of the main logic board 322. The main logic board 322 comes into contact with the upper portion 318A of the enclosure structure 318 via an edge area of the main logic board 322. In accordance with a second heat dissipation path B, the heat absorbed by the substrate of the main logic board 322 is transferred in its planar substrate and passed to the upper portion 318A of the enclosure structure 318 by heat convection via the edge area of the main logic board 322. The second heat dissipation path B merges with the first heat dissipation path A, allowing the heat absorbed by the substrate of the main logic board 322 to be dissipated out of the housing 308 of the display assistant device 200 (e.g., dissipated via the first thermal conductive pad, carried out by the sound waves projected by the rear speaker 316).

In some implementations, in accordance with a third heat dissipation path C, heat generated by the electronic components 332 mounted on the main logic board 322 is dissipated via a front surface of the screen 204 of the display assistant device 200. The heat passes the middle frame 304 and the display front 302. In some implementations, a first thermal spreader is disposed between the main logic board 322 and a rear surface of the middle frame 304, and is configured to transfer heat from the electronic components 332 and the substrate of the main logic board 322 to the middle frame 304. Further, in some implementations, a second thermal spreader is disposed between the display front 302 and middle frame 304. The second thermal spreader comes into contact with a portion of (e.g., half of) the rear surface of the display front 302, and redistributes heat evenly across itself and the portion of the rear surface of the display front 302. The first thermal spreader also absorbs heat from the middle frame 304. As a result, the heat associated with the display front 302 and the main logic board 322 is at least partially dissipated into the ambient via the front surface of the display front 302.

In accordance with some implementations of this application, the upper portion 318A is electrically and thermally conductive, and serves multiple functions including, but are not limited to, sealing the rear speaker 316, deterring electromagnetic interference to the electronic components 332, and absorbing heat generated by the electronic components 332. An example material of the upper portion 318 of the enclosure structure 318 is metal. The bottom portion 318B does not need to be electrically and thermally conductive although it can be. In some implementations, the bottom portion 318B is made of a non-metallic material (e.g., wood and synthetic fiber) to control an overall weight of the display assistant device 200. In some implementations, the upper portion 318 is a metallic hollow structure for the purposes of reducing cost and controlling the weight of the display assistant device 200. In some implementations, the upper portion 318 has a top surface made of an electrically and thermal conductive material configured to facilitate heat dissipation and electromagnetic shielding, while a body of the upper portion 318 is not electrically and thermally conductive.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives.

Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A display assistant device, comprising:
   a screen;
   a rear speaker;
   one or more front speakers;
   an enclosure structure in which the rear speaker and the one or more front speakers are mounted, the enclosure structure exposing a speaker opening of each of the rear speaker and the one or more front speakers and providing a sealed enclosure for a rear portion of each of the rear speaker and the one or more front speakers, wherein the enclosure structure further includes an electrically conductive portion; and
   one or more electronic components coupled to the electrically conductive portion of the enclosure structure;
   wherein the electrically conductive portion of the enclosure structure is electrically coupled to a ground of the display assistant device to provide electromagnetic shielding for the one or more electronic components and forms part of the sealed enclosure of the speaker.

2. The display assistant device of claim 1, wherein the enclosure structure includes a base portion distinct from the electrically conductive portion, wherein each of the one or more front speakers is individually packaged and integrated into the base portion of the enclosure structure, the one or more front speakers facing a front view that is opposite to a rear view which the rear speaker faces.

3. The display assistant device of claim 2, wherein the enclosure structure includes a plurality of separated sealed spaces each of which provides a respective sealed enclosure for one of the front and rear speakers.

4. The display assistant device of claim 2, wherein the enclosure structure is disposed and concealed in a housing, and the housing includes a plurality of speaker grill portions that permit sound generated by the rear speaker and the one or more front speakers to exit the housing of the base portion.

5. The display assistant device of claim 4, wherein the plurality of speaker grill portions is distributed on at least a rear side and a front side of the housing, facing the rear speaker and the one or more front speakers, respectively.

6. The display assistant device of claim 4, wherein the housing is wrapped with a fabric that conceals the rear speaker and the one or more front speakers and is substantially transparent to sound generated thereby.

7. The display assistant device of claim 2, wherein the rear speaker is a woofer speaker configured to produce first audio frequencies in a first frequency range, and each of the one or more front speakers is a tweeter speaker configured to produce second audio frequencies in a second frequency range, the second audio frequencies are higher than the first audio frequencies.

8. An electronic device, comprising:
a speaker;
an enclosure structure in which the speaker is mounted, the enclosure structure exposing a speaker opening of the speaker and providing a sealed enclosure for a rear portion of the speaker, wherein the enclosure structure further includes an electrically conductive portion; and
one or more electronic components coupled to the electrically conductive portion of the enclosure structure;
wherein the electrically conductive portion of the enclosure structure is electrically coupled to a ground of the electronic device to provide electromagnetic shielding for the one or more electronic components and forms part of the sealed enclosure of the speaker; and
wherein the electrically conductive portion of the enclosure structure is thermally coupled to the one or more electronic components and acts as a heat sink that is configured to absorb heat generated by the one or more electronic components and dissipate the generated heat away from the one or more electronic components.

9. The electronic device of claim 8, wherein:
the enclosure structure is configured to attach to a base mount plate, and
the base mount plate includes a top surface facing a bottom surface of the enclosure structure; and
the top surface includes a plurality of stud fasteners configured to mate with a plurality of receiving fasteners on the bottom surface of the enclosure structure.

10. The electronic device of claim 9, wherein the plurality of stud fasteners includes a first stud configured to match a first receiving fastener with a first tolerance and a second stud configured to match a second receiving fastener with a second tolerance, the first tolerance being smaller than a threshold tolerance and the second tolerance being larger than the first tolerance.

11. A speaker assembly, comprising:
a speaker;
an enclosure structure in which the speaker is mounted, the enclosure structure exposing a speaker opening of the speaker and providing a sealed enclosure for a rear portion of the speaker, wherein the enclosure structure further includes an electrically conductive portion; and
one or more electronic components that are mounted on a logic board, wherein the logic board is mounted on the electrically conductive portion of the enclosure structure, thereby allowing the one or more electronic components to be mechanically coupled to the electrically conductive portion of the enclosure structure via the logic board;
wherein the electrically conductive portion of the enclosure structure is electrically coupled to a ground of the speaker assembly to provide electromagnetic shielding for the one or more electronic components and forms part of the sealed enclosure of the speaker.

12. The speaker assembly of claim 11, wherein the electrically conductive portion of the enclosure structure is thermally coupled to the one or more electronic components and acts as a heat sink that is configured to absorb heat generated by the one or more electronic components and dissipate the generated heat away from the one or more electronic components.

13. The speaker assembly of claim 12, wherein a thermal spreader is disposed between the one or more electronic components and the electrically conductive portion of the enclosure structure, and is configured to transfer heat generated by the one or more electronic components to the electrically conductive portion.

14. The speaker assembly of claim 11, wherein the electrically conductive portion of the enclosure structure includes a recess configured to receive the one or more electronic components when the logic board is mounted on the electrically conductive portion of the enclosure structure.

15. The speaker assembly of claim 14, further comprising:
a thermal spreader disposed in the recess and thermally coupled between the one or more electronic components and the electrically conductive portion of the enclosure structure, wherein the thermal spreader is configured to transfer heat generated by the one or more electronic components to the electrically conductive portion.

16. The speaker assembly of claim 11, wherein the logic board further includes a ground plane that is electrically coupled to the electrically conductive portion to provide the electromagnetic shielding to enclose the one or more electronic components.

17. The speaker assembly of claim 11, wherein:
the one or more electronic components are surrounded by an electromagnetic shielding fence fixed on the logic board;
a flexible electrically conductive foam is disposed on top of the electromagnetic shielding fence; and
when the logic board is mounted on the electrically conductive portion of the enclosure structure, the electrically conductive portion of the enclosure structure is pressed onto the flexible electrically conductive foam and electrically coupled to the electromagnetic shielding fence via the flexible electrically conductive foam, thereby forming the electromagnetic shielding that closely encloses the one or more electronic components.

18. The speaker assembly of claim 11, wherein the speaker is a rear speaker and the enclosure structure includes a base portion distinct from the electrically conductive portion, the speaker assembly further comprising:
one or more front speakers each of which is individually packaged and integrated into the base portion of the enclosure structure, the one or more front speakers facing a front view that is opposite to a rear view which the rear speaker faces.

19. The speaker assembly of claim 11, wherein the electrically conductive portion provides an entire top surface of the enclosure structure.

* * * * *